(12) United States Patent
Hughes et al.

(10) Patent No.: US 6,870,831 B2
(45) Date of Patent: Mar. 22, 2005

(54) FLEXIBLE, SELF-ALIGNING TIME AND SPACE SWITCH FABRICS

(75) Inventors: Andrew Milton Hughes, Saskatoon (CA); Douglas Konkin, Saskatoon (CA); Carl Dietz McCrosky, Saskatoon (CA); Winston Mok, Vancouver (CA); Jeffrey Scott Roe, Saskatoon (CA); Kenneth Evert Sailor, Saskatoon (CA)

(73) Assignee: PMC-Sierra, Inc., Burnaby (CA)

( * ) Notice: Subject to any disclaimer, the term of this patent is extended or adjusted under 35 U.S.C. 154(b) by 675 days.

(21) Appl. No.: 09/845,171

(22) Filed: May 1, 2001

(65) Prior Publication Data

US 2002/0001305 A1 Jan. 3, 2002

Related U.S. Application Data

(60) Provisional application No. 60/201,753, filed on May 4, 2000.

(51) Int. Cl.[7] ............................................. H04L 12/50
(52) U.S. Cl. ........................ 370/352; 370/357; 370/370
(58) Field of Search .............................. 370/352, 357, 370/360, 366, 367, 369, 370, 375, 376, 380, 386, 387, 388

(56) References Cited

U.S. PATENT DOCUMENTS

| | | | |
|---|---|---|---|
| 4,912,706 A | | 3/1990 | Eisenberg et al. |
| 5,570,358 A | | 10/1996 | Alatalo et al. |
| 5,627,826 A | * | 5/1997 | Kameda et al. ............. 370/376 |
| 5,933,427 A | * | 8/1999 | Liang ......................... 370/359 |
| 5,978,370 A | * | 11/1999 | Shively ...................... 370/370 |
| 6,041,050 A | * | 3/2000 | Sanders ...................... 370/370 |
| 6,693,902 B1 | * | 2/2004 | Sahlman et al. ............ 370/369 |
| 6,693,903 B1 | * | 2/2004 | Shively ...................... 370/370 |

FOREIGN PATENT DOCUMENTS

EP    638221    11/1993

* cited by examiner

*Primary Examiner*—Chi Pham
*Assistant Examiner*—Anh-Vu Ly
(74) *Attorney, Agent, or Firm*—Oyen Wiggs Green & Mutala

(57) ABSTRACT

A time:space:time switch fabric incorporating an odd integer number of spatially distributed data switches and a plurality of spatially distributed data serializers. Each data switch has a first plurality of ingress ports, an equal plurality of egress ports, and a space switch for selectably interconnecting any one of the ingress ports to any one of the egress ports. Each data serializer has an input bus for receiving signals to be routed through the switch fabric, an output bus for outputting signals routed through the switch fabric, a plurality of egress ports selectably connectible to any one of the data switch ingress ports, and an equal plurality of ingress ports selectably connectible to any one of the data switch egress ports. The ingress/egress ports are characterized by:

(A) p planes, where p is a power-of-two integer less than or equal to the number of data serializer ingress and egress ports;
(B) s stages, where s is an odd integer number; and,
(C) a depth d, where d is a power-of-two integer less than or equal to the number of data switch ingress and egress ports.

33 Claims, 16 Drawing Sheets

FLEXIBLE, SELF-ALIGNING TIME AND SPACE SWITCH FABRICS

REFERENCE TO RELATED APPLICATION

This application claims the benefit of U.S. Provisional Patent Application Ser. No. 60/201,753 filed 4 May, 2000.

TECHNICAL FIELD

This invention relates to high speed, time division multiplexed (TDM) signal switching via time and space switch fabrics in devices such as synchronous optical network (SONET) cross-connects, add-drop multiplexers, terminal multiplexors, etc.

BACKGROUND

Time and space switching fabrics have been used for many years in a variety of switching and multiplexing devices including SONET cross-connects, SONET add-drop multiplexers, SONET terminal multiplexers, and digital signal-level 0 (DS0) switches. Time and space switching fabrics are common in essentially all telephony and SONET switching devices on the market today.

There are three basic mechanisms used in time and space switching: 1) time switching stages, 2) space switching stages, and 3) combined time and space switching stages, which are referred to as multi-ported memory switches, or just memory switches. Switching fabrics are constructed by composing one or more stages of these three types of switching elements.

These switching mechanisms are most commonly applied to signals with repeating patterns of subsidiary signals (e.g., the repetition of telephony's PCM octets in a standard T1 signal, or the repetition of STS-1 components in a standard SONET signal such as an STS-12/OC-12). The repeating subsidiary signals are called the "grains" of the switching application; a single repetition of these grains is called a "grain group". The sequential position of a grain within a grain group is identified by a time slot number (I). Time slot numbering starts at one for the first grain in the grain group and increments sequentially to G for the last grain in the grain group. A repeated sequence of a fixed number of grains is called a "frame", where a frame contains an integer multiple of grain groups.

Switching fabrics have multiple ports. Each port has two components: an ingress port which supplies a signal of repeating grain groups to the switch and an egress port which generates a signal which consists of recombined/switched ingress signal grains in the same repeating grain group pattern. The signals supplied to an ingress port and generated by an egress port are often differentially encoded to eliminate common mode noise that may be introduced in the inter-connect between an egress port and an ingress port. Differentially encoded signals are received or transmitted via two wires, one wire for the signal (positive encoding) and one wire for the complement of the signal (negative encoding). The ingress port is implemented using a differential receiver and the egress port is implemented using a differential transmitter. A differential receiver has two connections, one for each of the negatively and positively encoded ingress signal, and outputs a single positively encoded signal for further processing by the switch. Similarly, a differential transmitter processes the egress port signal to produce positive and negatively encoded data for output on two connections. The two connections that comprise a differential signal are referred to as a connection pin, an input pin for an ingress port and an output pin for an egress port.

The fundamental objective of any time and space switching fabric is to implement some controlled mapping on ingress grains to egress grains (e.g., in a telephony application, it is desired to connect any input grain (a repeating PCM sample) to any egress grain position, in order to connect two telephones). If all the grains (G) appearing in grain groups on all the ingress ports (N) of a fabric are considered, it can be seen that there are $S=N*G$ ingress grains; likewise, in a symmetric fabric the egress ports offer $S=N*G$ grains to be filled. If all of the S ingress grains are to be mapped to all of the S egress grain slots, the fabric implements a S! permutation of grains (where a permutation is a one-to-one and onto functional mapping). In practice, several modifications to the concept of permutation mapping are useful: gaps (unused grains) commonly occur on the ingress and the egress sides, thus the switching mapping is less than a permutation in that less than S ingress grains are mapped to less than S egress grain slots. Also, there are applications in which ingress grains are mapped to multiple egress grain slots (e.g. multicast, broadcast, and protection)—these mappings broaden the scope of permutations to include the possibility of one-to-many. To avoid unnecessary complexity, the following discussion refers to all time and space mappings as "permutations", but with the understanding that these mappings are more general than pure permutations, as explained above.

Time switching stages have a single ingress port and a single egress port. An exemplary time switch implementation is shown in FIG. 11. The switching stage consists of two data memories, which may be implemented in a number of different ways including the use of a single multiple-port memory. Each of the two data memories is sufficiently large to store a copy of a grain group. One data memory is filled with a grain group from the ingress port while the second data memory is used to generate a grain group for output from the egress port. The ingress and egress ports alternate between the two data memories that are written to or read from respectively on grain group boundaries. The ingress port fills one of the two data memories with grains in a sequential manner. The egress port selects grains to fill the egress grain groups from the other of the two data memories, in an arbitrary sequence, thereby allowing the grains to be reordered in time. The particular sequence of reading from data memory by the egress port is controlled by a switching control memory which contains addresses of ingress grains which are to be used to fill the egress grains. The switching control memory can be programmed via a microprocessor interface to contain any sequence of the ingress grain addresses, thereby allowing any time permutation of the ingress signal to be generated. The latency of this switching element is the time required to transmit one grain group, although particular grains may have a latency which varies from one grain time to two grain group times, as these individual grains are switched in time from the ingress to the egress grain groups. It is possible for any ingress grain to be used to fill more than one egress grain slot, thereby supporting multicast and broadcast use of these time switching stages. Also, ingress grains can be dropped by not being selected to fill any egress grain slot.

Space switching stages have multiple (N) ports, each port consisting of an ingress and an egress portion, and each providing and generating the same grain group pattern. An exemplary time switch implementation is shown in FIG. 12. For each grain in the grain group, these switches allow each of the N egress ports to select any ingress grain. A grain which appears in time slot I on an ingress port must appear in time slot I on any egress ports which select it, but egress port X can select grains from any of the N ingress ports. Each egress port has a switching control memory which contains the address of the ingress port which should supply the selected grain for each grain slot in the egress port. These memories are programmed to dictate the switching pattern of the overall space switching stage. As in the time switching stages, ingress grains can be used to fill zero, one, or more egress grains, thereby supporting the dropping of grains, unicast, multicast, and broadcast. The egress ports' switching control memories may be separated into N separate memories, or combined as one common memory.

Memory switching stages are a combination of time switching and space switching. In these stages, multiple ports (N) supply ingress signals and generate egress signals. As with the time switching stages, the ingress ports fill an internal data memory with their grains and egress ports read their grains from this internal data memory; two pages of data memory are used, one is filled by the ingress ports while the other is used to fill the egress ports, and the two pages of data memory alternate their roles on grain group boundaries. In memory switching stages, however, there is one common data memory for all N ports. The consequence of this is that the egress ports can select grains from any ingress port at any time slot. This enables simultaneous switching in time and space, mediated by this common data memory. Each ingress port is assigned two sections of the common data memory for recording its two alternating grain groups. Each egress port has a switching control memory which gives the address in the common data memory of where it should select its output grains. The mapping of input ports and grains to this common memory can be done in a variety of ways, but they all share the common factor that each grain of each ingress port has a unique, known location which can be described by a memory address. These memory addresses are stored in the egress ports' switching control memories to allow them to select arbitrary ports and arbitrary grains. The egress ports' switching control memories may be separated into N separate memories, or combined as one common memory.

In the above descriptions of switching stages, the ingress ports passively supply grains in sequential order to a data memory (time and memory switching) or passively supply grains for selection by the egress ports (in a space switch, in which the egress ports normally select among the available ingress grains by means of multiplexors). In all three switching stage types, the egress ports have been described as having the power of control, mediated by their control memories which dictate which ingress grains are to be selected. However, this is an arbitrary choice; essentially equivalent to having the ingress ports fill the grain data memories in a controlled, non-sequential pattern dictated by an ingress port switching control memory. In such a system, the egress ports are filled sequentially from the selected source. This applies directly in the case of time and memory stages; in the case of space stages, the input ports must be able to direct their grains to specific egress ports—this is much less practical than the egress multiplexer selection method which is usually employed.

There are other, usually less practical, means of implementing time and space switching mechanisms which are not described here, but the essential ideas remain the same: grains are switched in time within temporal grain groups without changing the ports (space); grains are switched in space (ports) without changing their time slot assignment; or grains are switched in both time and space in a single combined stage.

Time, space, and memory switching stages are combined to form time and space (and memory) switching fabrics. One common fabric architecture consists of a single stage of memory with N ports. N duplex loads are connected to the N ports of the memory fabric. Any permutation can be implemented by this simple switch fabric. The motivation to move to multiple stage time and space fabrics is due to the inability of memory technology to scale to the aggregate bit rates imposed by N ports each supplying and consuming the bit rate represented by the grain group.

Another common fabric is the time:space:time fabric, in which the three stages—left-to-right and ingress-to-egress—are: 1) time, 2) space, and 3) time. In these fabrics, each of N ports is connected to both a stage 1 and a stage 3 time stage. Each stage 1 produces an arbitrary time permutation of one input signal and passes this temporal rearrangement to stage 2; stage 2 allows an arbitrary space permutation of grains from N ingress ports to N egress ports, which are connected to the stage 3 time stages; the stage 3 units implement an arbitrary temporal rearrangement for the egress ports. It has been proven that time:space:time fabrics can implement arbitrary S! permutations.

Whereas single stage memory fabrics are limited by the input/output capabilities of memory stages, time:space:time fabrics are limited by the ability to build practical space stages, as all N ports must converge at the space stage. This problem is managed by factoring the space stage into multiple stages, producing time:space:space:space:time fabrics and a variety of other, related fabric structures. In five stage time:space:space:space:time fabrics, stages 2 and 4 serve to fanout and re-converge multiple signals to and from a multiple plane central stage 3 which achieves all the actual switching. In these multiple plane fabrics, the space stage units do not exceed a particular technology's ability to build space stage units, but the combination of the multiple planes achieves a desired switching capacity much larger than the biggest individual space stage that can be fabricated. These five stage switches are also known to be capable of implementing arbitrary permutations.

There are numerous possible time and space fabrics related to the time:space:space:space:time fabric. High depth fabrics can be formed by using 2*D+1 internal space stages. The time:space:time and time:space:space:space:time fabrics are examples of this pattern with D=0 and D=1, respectively. Fabrics can and have been built with larger D, in particular D=2 has been used in telephony switches manufactured by AT&T.

Time and space switches can also be composed of alternating time and space stages, e.g. time:space:time:space:time:space:time. These fabrics allow simpler routing algorithms, as the extra internal time stages allow the switching achieved in the various space stages to be more independent. These fabrics have been limited in practice by their extra costs.

All time and space switching stages and fabrics must know where the boundaries between grain groups are located in time on the ingress/egress ports. The switching problem is defined in terms of these grain groups, so it is necessary that the switch implementation respect these boundaries. In a time or memory stage, the filling of the ingress memory pages must be done with knowledge of the grain group time boundary, or the egress ports will be unable to know which memory location contains which grain. Also, the timing of the switch-over from one memory page to the next could not be timed. Thus, it is necessary for time and memory ingress ports to be able to detect grain group boundaries, and respect these boundaries internally in their memory operation.

Space stages have another, related need to know and respect the grain group boundaries on their ports. In a space stage, all N copies of grain I in the grain group must be present at once in order that the egress ports be able to make their choice among them. These switching stages do not have memory which could be used to delay ingress grains until they are desired, so all of the grains of grain slot I must appear at the same time. This implies that all N ingress ports must be synchronous with respect to the grain group. This can be achieved in a variety of ways, but is always a significant difficulty in the design of a large composite fabric, as multiple units must be closely coordinated. Memory stages share this need to coordinate multiple signals in time.

There have been many implementations of time and space switching fabrics in the last fifty years; all of which adhere to the general principles outlined above and further elaborated in many textbooks. The prior art is further exemplified by U.S. Pat. No. 4,912,706 "Frame Synchronization in a Network of Time Multiplexed Optical Space Switches"; European Patent No. 638,221/EP B1 "Method For Establishing Data Connections in an Auxiliary Exchange Communications Installation"; and, U.S. Pat. No. 5,570,358 "Method for Implementing Switching in Time or Space Domain".

As understood by Applicant, U.S. Pat. No. 4,912,706 addresses the problem of achieving synchronization of all frames arriving at a space switch, to allow switching of grains to take place on a common frame boundary. The method used supports a distributed architecture (with the normal clock skew and synchronization problems raised by distributed architectures). The receivers transmit (via their co-located transmitters) an indication of the phase error they are receiving. The remote transmitter then uses this information to adjust the timing of its transmission, in order to meet the timing requirements of the receiver for coordination. By making these timing adjustments on all links, each device can co-ordinate the arrival times of all received signals, and thereby achieve local synchronous operation. The present invention addresses the same problem, but as hereinafter explained in greater detail, relies on a single clock source to avoid clock frequency differences (other than the usual clock multipliers and dividers); and uses clock (phase) recovery at the receivers to find bit alignment, 8b/10b "comma" characters to find byte alignment, 8b/10b "comma" characters to find frame alignment, and a receiver FIFO to adjust the incoming signals to a local synchronous process.

As understood by Applicant, European Patent No. 638, 221/EP B1 addresses the problem of coordinating switching control page switch-overs, to support hitless re-connection. Special codes are transmitted on the data paths to request connection switch-overs. As hereinafter explained, the present invention addresses this problem by distributing a page switch-over request approximately between successive start-of-frame signals (the timing constraints are very loose); each local switching element uses this request to initiate a switch-over only when the local start-of-frame event occurs (offset from the global start-of-frame event by the local start-of-frame delay register count).

As understood by Applicant, U.S. Pat. No. 5,570,358 supports multi-grain sized switching by organizing the switching control memories to switch the smallest possible grain size, and using repeated switch settings to switch the groups of multiple minimal grains which constitute the larger granularities switched by the fabric. This is applied only to a single memory switching stage. The present invention is organized to switch at a granularity of STS-1. Larger grain sizes are not directly supported but the invention can be readily adapted to switch higher granularity STS signals (STS-n(C)) by arranging the common switching of n STS-1s.

SUMMARY OF INVENTION

The invention provides time: space: time switch fabric incorporating a plurality of spatially distributed data switches. Each data switch has a first plurality of ingress ports and an equal plurality of egress ports; a space switch for selectably spatially rearranging data transmitted from any ingress port and any egress port; an ingress time switch coupled to the input of the space switch to selectably temporally rearrange data received on the ingress ports; and, an egress time switch coupled to the output of the space switch, to selectably temporally rearrange data output by the space switch. A plurality of spatially distributed data serializers are provided, each having an input bus for receiving signals to be routed through the fabric; an output bus for outputting signals routed through the fabric; a second plurality of egress ports, each being a high speed serial link selectably connectible to any one of the data switch ingress ports; and, an equal plurality of ingress ports, each being a high speed serial link selectably connectible to any one of the data switch egress ports. The data switch ingress and egress ports and the data serializer ingress and egress ports are configured to form a composite fabric comprising p*s*d interconnected data switches characterized by at least p planes, where p is a power-of-two integer less than or equal to the second plurality of data serializer ingress and egress ports; s stages, where s is an odd integer number; and, a depth d, where d is a power-of-two integer less than or equal to the first plurality of data switch ingress and egress ports.

DESCRIPTION

Introduction and Background

Figure 1:
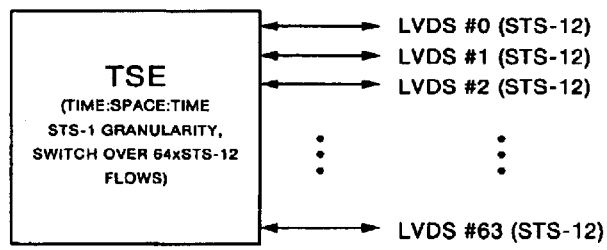
FIG. 1 schematically depicts a transmission switching element (TSE) having 64 low voltage differential signal (LVDS) ports.

The invention will be explained in terms of a "Transmission Switching Element" (TSE), and a "Telecommunications Bus Serializer" (TBS). The TBS and TSE implement SONET time and space switching fabrics. The grain of TSE/TBS fabrics is the SONET Synchronous Transport Signal 1 (STS-1); the grain group consists of twelve STS-1s; the ports' signals are SONET STS-12 groups. The choice of the grain size is a fundamental design consideration, as it is the smallest grain size that can be switched in SONET streams without additional pointer processing (which is required to align the smaller units of SONET streams to permit smaller granularity switching); the choice of STS-12 as the grain group unit depends only on the maximal speed of present day differential serial signalling technology—the invention can readily be adapted to accommodate larger grain groups and/or faster serial links.

A significant aspect of the invention is the use of fast serial links to transport signals to and from the ports on the TSEs and TBSs which comprise any given fabric. Fast, constant current LVDS (low-voltage differential signaling) at 777.6 Mb/s is used to carry each STS-12 signal. This speed is dependent on the details of the SONET standards, but the essential issues involved in this invention's use of serial link technology are independent of SONET. Nevertheless, particulars of the SONET implementation are provided to assist persons skilled in the art in comprehending the invention.

An STS-1 frame consists of 810 8-bit groups (octets, or bytes) which repeat 8000 times per second; this comprises 51.84 Mb/s. An STS-12 frame consists of twelve STS-1s byte-interleaved; this comprises 12*51.84=622.08 Mb/s; there are 12 grains in each grain group, each grain consisting of one interleaved byte from one of the twelve STS-1s.

Fast serial link receivers (such as, but not limited to, LVDS) must address a fundamental problem: they must be able to recover the clock of the transmitted signal in order to recover and properly time the transmitted data. Clock is not transmitted, but is recovered by observing the transitions present (0 to 1 and 1 to 0) in the transmitted data. It is possible for the transmitter to transmit a long series of bits without transitions, depending on users' traffic patterns and on encapsulating protocols designed into the system. Such transitionless sequences could lead to loss of clocking at the receiver. There are two standard approaches to avoiding this problem: the use of an expanded code (e.g. 8b/10b) to allow the basic eight bit codes to be embedded in a larger code space (e.g. the 10 bit code space of 8b/10b) in such a way as to avoid transmitting code words which contain too few transitions. The present invention adopts 8b/10b coding to obtain adequate transitions at the receiver to recover the transmitter's clock. The serial bit stream carrying 8b/10b codes must be properly framed into its 10b code words. This is done by examining the bit stream at each possible code word alignment (there are ten), until an alignment is found which generates no line code violations. This is standard practice.

As previously explained, time and space fabrics must allow all switching stages to recognize and coordinate their switching activities to the boundaries of the grain groups. The present invention uses a special code of 8b/10b to mark the beginnings of STS-1 frame boundaries. The 8b/10b "comma" character is used to mark at least some of the beginnings of STS-1 frames (in the SONET J0 octet). This allows the receivers of the TSE and the TBS to recognize STS-1 frame boundaries. The SONET frame boundary is used to reset a counter which counts through the repeating 12*9*90 octets of the STS-12 frame. This counter, reduced modulo-twelve, is used to identify the relative positions of the grains of the twelve STS-1s.

The 8b/10b "comma" special character is not required to be present in each SONET frame; the first occurrence of the comma character sets the frame counter, which then runs modulo-(12*9*90) to count out the positions in successive frames which may or may not contain the comma character.

Comma characters found in the expected location (when the frame counter is zero) are passively accepted as confirmation of the frame's continued proper alignment. Comma characters found out of position indicate a misalignment of the frame due to some transmission or reception error; such erroneous comma characters cause the receiver to resynchronize to the link by looking for another valid comma character. The receiver may be configured to resynchronize on a single occurrence of an erroneous comma character, or when a count of successive errors exceeds a given threshold. The particular technique used to initiate resynchronization of a receive link is not essential to this invention.

Thus, all receivers are aware of the location of their grain group boundaries. However, being aware of the boundaries is not sufficient. Space and memory switching stages must be able to align all ingress ports to a common repeating frame boundary in order to properly switch grains within grain groups and ports. This imposes two requirements: the entire time and space switching fabric must share a common clock, and there must be means to align the frames (and their grain groups) at each transmitter and each receiver. One straight-forward way to achieve the required common clocking and frame alignment is to distribute a common clock and a common start-of-frame signal aligned with that clock, and to have all transmitters transmit synchronously with respect to this common clock; then all receivers can also use this common clock and start-of-frame signal to find their grains and have them properly anchored in their frames and grain groups. However, this requires a strictly synchronous system, which is impractical given modern technology trends and opportunities. The present invention does not assume strictly synchronous operation; in particular, the use of fast serial differential signaling contradicts the assumption of a single, effectively skew-free (or, more accurately, skew compensated) clock. In this invention, receivers must recover their own clock. The links from which they recover clocks may be of significantly different length; at the speed of the signals in copper (or in light in fibre, where bridging between racks of shelves is achieved with optical links) these differences in link length would cause mis-alignment of the grain groups and frames.

The solution used in this invention is to: 1) distribute a common clock from a single clock generator, 2) but to allow skew and wander in this clock and in clocks generated from this common clock, 3) by having each receiver of a serial signal recover clock phase from the data, 4) and having each receiver recover 8b/10b byte alignment by inspecting and checking the bit stream for continuing proper 8b/10b codes, 5) and having each receiver identify the location of the frame marking 8b/10b comma character, 6) and having each switching fabric component (i.e. TSE or TBS) align all input links to these common 8b/10b comma characters which mark frame boundaries. This mechanism assures that each device can recover bit, byte, grain group and frame alignment from its multiple ingress ports.

In a multi-stage time and space fabric, there must be delay in the frames as they pass from the ingress to the egress ports. It is possible to delay entire grain groups or entire frames at each stages in order to have each stage receive a new grain group or frame at exactly the same time, but this is unacceptable as it imposes high latency on the overall switch fabric. The present invention adopts a novel method to accommodate this necessary delay through the fabric without unnecessarily increasing overall latency.

All elements (TSEs and TBSs) in the fabric receive a common start-of-frame signal (an 8 kHz signal for SONET applications). This corresponds to the time at which the left-most ingress port devices begin emitting their frames. The next stage of devices will receive these frames after some delay due to the internal switching delays of the first stages (e.g., as in a time switch), the internal transfer delays of the first stage (the various flip-flop stages necessary to build a modern high-speed digital circuit), the transfer delays due to the serial link between the first stage devices and the second stage devices, and the delays due to the front end of the second stage devices serial line receivers. In any practical configuration of TSE and TBS, these times will be nearly constant for all first stage to second stages links, as all the first stage elements will begin frames at the same time, all the first stage devices have common internal delays, all the first-to-second stages links are of approximately the same length, and the second stages will share common receiver logic. Thus, while there may be considerable latency in the overall first stage to second stage transfer, there will be relatively little variation in the latency from link to link. The TSE/TBS receivers have internal FIFOs (first-in, first-out queues) which accommodate this variation in latency. These FIFOs are 24 bytes deep (this particular depth is not essential to the invention, other depths—both smaller and deeper—are practical and not significantly different). Some time after the fabric's common start-of-frame timing signal, new frames will begin to appear in these receiver FIFOs in the second stage devices. At some later time, all of the links will have received and stored their start-of-frame comma characters in these FIFOs. At this time, it is safe to begin locally synchronous switching of the grain groups within the frames.

The TSE/TBS devices have start-of-frame delay registers which allow the user to program in a number of 77.76 MHz clock ticks (the time for a single octet to be transmitted in 8b/10b on a 777.6 MHz serial link) to wait from the start-of-frame signal before expecting that the starts of frames have appeared in all the receiver FIFOs. This delay counter is used to program the minimal safe delay from the global start-of-frame before assuming that local switching can begin. All devices in the second stage (normally) use the same delay counter. The delay counter is set to a value which results in the start of frame comma character being assured of being present in all receiver FIFOs, allowing for differential latency on links and the various forms of clock skew.

Since all clocks within the TSE/TBS fabric are derived from a common source, and clock skew and wander is limited, the safety margins supported by the twenty-four byte receiver delay FIFO provide assured correct operation at all stages (i.e., the various forms of variation in arrival of frame boundaries at receivers is much less than the variable delay supported by this FIFO).

The third and successive stages of a TSE/TBS fabric use exactly the same mechanism. The 1-th stage always emits frames at a common time, based on the applicable frame delay counter; the I+1-th stage always has some start-of-frame delay register value appropriately larger than the I-th stage, to accommodate for the added latency.

Users of the TSE/TBS devices program their own delay values, depending on the latency they have built into their implementation of a time and space fabric. The TSE/TBS devices impose a maximal differential latency on all links from stage I to stage I+1, based on the depth of the twenty-four byte receiver FIFO.

TSE/TBS Architecture

The basic architecture of the TSE and the TBS are now described. The TBS contains two switching stages: stage 1 and stage D of any D-stage fabric. The "line side", or ingress/egress port side of the TBS is implemented as a parallel bus (as opposed to the serial links used elsewhere in TSE/TBS fabrics). This is a matter of convenience for communications with existing telecommunications devices, and does not in any way affect the essential characteristics of the invention. The "fabric" side of the TBS uses the serial links described above. Both switching stages in the TBS (the "ingress" stage, from the line to the core fabric, and the "egress" stage, from the core fabric to the line) are memory stages. The ingress stage has one STS-48 ingress port (or equivalently, four STS-12 ports, depending on usage) which feeds a memory as described above for memory switching stages. The ingress stage also has twelve egress ports, which draw grains from this common memory. Each of the twelve egress ports is an STS-12 capable serial link. In this configuration, there is excess egress bandwidth in this memory element. This excess egress capability is used for several purposes, which will be described later.

The egress path (stage D of D) of the TBS is also a memory stage. Here, there are twelve ingress serial links which feed grains into the common memory, and four STS-12 (or one STS-48, depending on usage) parallel ports to the attached line-side devices. Here, there is excess ingress bandwidth into the memory, compared to the egress bandwidth from the memory—the applications of this feature are also described later.

The TSE has N=64 duplex serial ports. Internally, the TSE is a three-stage time:space:time fabric. Each ingress serial link feeds an ingress time stage with an STS-12 flow; each ingress time stage feeds an equivalent (but time re-arranged) flow to one of the N=64 ports of a stage 2 space switch; each egress port of this space switch feeds an equivalent STS-12 flow (now time and space re-arranged) to egress time stages; these egress time stages feed a time:space:time re-arranged equivalent flow to the egress ports.

As with the TBS, the TSE has a delay counter to delay its grain group switching time from the global start-of-frame signal. Internally, as the TSE has three cascaded switching stages, there is also a delay between switching in the three stages, but here the delay is completely predictable and synchronous; it is implemented as a fixed delay to accommodate the various flip-flop delays inherent to the particular VLSI implementation of the device. For TSE/TBS stage delay purposes, the internal staging arrangement of the TSE is hidden.

For example, consider a time space fabric consisting of TBSs which serve as stage 1 and N and a TSE which serves as a common core switch. As described above, these TBSs actually contribute two memory stages which constitute the first and last stages of the aggregate fabric. The TSE contributes three additional stages: time:space:time. The overall fabric thus has five stages (two from the TBS and three from the TSE), constituting a memory:(time:space:time):memory fabric (where the parentheses indicate the grouping of stages contained in the TSE). In this configuration, both the ingress and egress sides of the core space stage have redundant stages. Either the memory stage or the time stage on each side is redundant; either can be set to a straight pass-through mode without loss of function (i.e. set to perform the identify mapping in time). (Notice that a memory stage is equivalent to a group of time stages when the memory stage does not move grains between physical ports.)

A fabric with three 'stages' of TSEs is actually an eleven stage fabric:

memory:(time:space:time):(time:space:time):(time:space:time):memory. Such a fabric can be reduced to a simpler fabric by inactivating (i.e. using identity mappings) in some of the time or memory stages. For instance, the following fabrics can be built:
1) memory:(space):(space):(space):memory (by not using any of the TSE time stages),
2) memory:(space:time):(space:time):(space):memory (using internal time stages to simplify the task of the open path algorithm by allowing temporal decoupling of the stages, by using only two of the six TSE time stages, and
3) :(time:space):(space):(space:time): (by not using the TBS memory stages, but using the exterior time stages of the TSE).

This flexibility of time and space fabric construction has many applications, some of which are now discussed. Configuration (1) above allows very large fabrics to be built. The use of memory stages in the first and last positions allows multiple planes of the interior TSE stages to be used. Each memory stage can send or receive any grain to any plane, thereby allowing arbitrary permutations to be sent through a multi-plane fabric. (The aggregate fabric sizes achievable with these various techniques are described later).

Configuration (2) above inserts time stages between all the interior space stages. This allows the same generality of aggregate fabric size as is permitted by configuration (1), but allows the internal time stages to be used for a variety of purposes, including internal temporal multicast/unicast, temporal decoupling of mappings from one space stage to the next, and internal support of fabric and external telecommunications line protection mechanisms.

Configuration (3) above does not use the memory stages in the TBSs. This is highly convenient in some applications which place TBSs on port line cards and have a central fabric consisting of a TSE on a separate card. The process structure of switching control software can be simplified in such applications by concentrating all switch settings on the core fabric card and not requiring that any switch settings take place on the multiple line cards.

Theoretically, the time stages of the TSE provide no additional switching capability. For example, in any of the different configurations discussed above, each is rearrangeably non-blocking without using any of the capabilities of the time stages of the TSEs. The TBS's memory switching capability can provide all needed time rearrangement to guarantee collision-free unicast routing through the TSEs comprising the various composite fabrics. In practice, however, time stages have practical uses. For example, a "global" routing algorithm which handles allocation and load (i.e. by determining an input and output schedule which guarantees that every port is not over-loaded), without also handling time rearrangement can be devised if separate "local" algorithms are provided to deal with time rearrangement by determining routing through individual TSEs. In this case, although no additional capability has been added beyond the already rearrangeably non-blocking fabrics, routing algorithm complexity can be reduced by simplifying the global routing problem and solving many smaller local problems.

Although fabrics constructed as described above are rearrangeably non-blocking for unicast traffic loads, these fabrics are blocking for arbitrary multicast loads (i.e. loads in which one ingress grain is scheduled for several different egress ports). Multicasting can be implemented through input port replication, by replicating an ingress grain in the input time stage and handling such replications by unicast through the space stage of the TSE. This approach is non-blocking within the TSE, but depends on excess capacity at the ingress port to accept the replicated grain. Often there is no excess capacity to be used in such a way.

If there is no excess ingress capacity, multicasting can alternatively be implemented by performing the necessary duplication in the space stage. In this case, two egress ports of the space stage are set to draw their input from a single ingress port. This multicasting method can block because the two ports may not have a time slot in which they can both be set to listen to the ingress port. For example, in the TSE there are 12 time slots and 64 ports. The small number of time slots compared to the number of ports makes blocking likely in the space stage.

Provision of a memory switch across several ports facilitates simple time rearrangement for individual ports as well as the ability to rearrange ingress grains across several ports. This has several advantages. For example, in ingress grain replication in support of multicasting, any free time slot on any of port can be used by any other port to translate multicast into non-blocking unicast. Similarly, if the egress time stage is replaced by a memory switch across several ports, then multicasting can be performed in the egress memory switch if several ports of the same group require a grain of a multicast connection. In addition, any of the ports in the group may receive a grain destined for any of the other ports of the group serviced by the memory switch. This capability can be used to conceptually increase the number of time slots by the number of ports multiplied by the number of time slots per port. For example, the TSE provides a memory switch across groups of four ports. This allows the TSE to be considered as 16 aggregate ports by 48 time slots providing additional space for multicast solutions. Scheduling algorithms can be simplified by taking advantage of switching within the port groups rather than arbitrarily limiting switching outside the space switch of the TSE to simple temporal switching within single port. By providing a similar memory switch in the TBS one may provide similar flexibility for the serializer. The serializer can make use of excess capacity for multicast support with input port replication. This capacity in the TBS is also important in load balancing across multi-planed fabrics. In this case, since egress and ingress ports can be wired to disjoint planes, it is necessary to switch between ports within a TBS in order to guarantee that no plane is overloaded.

Figure 8:
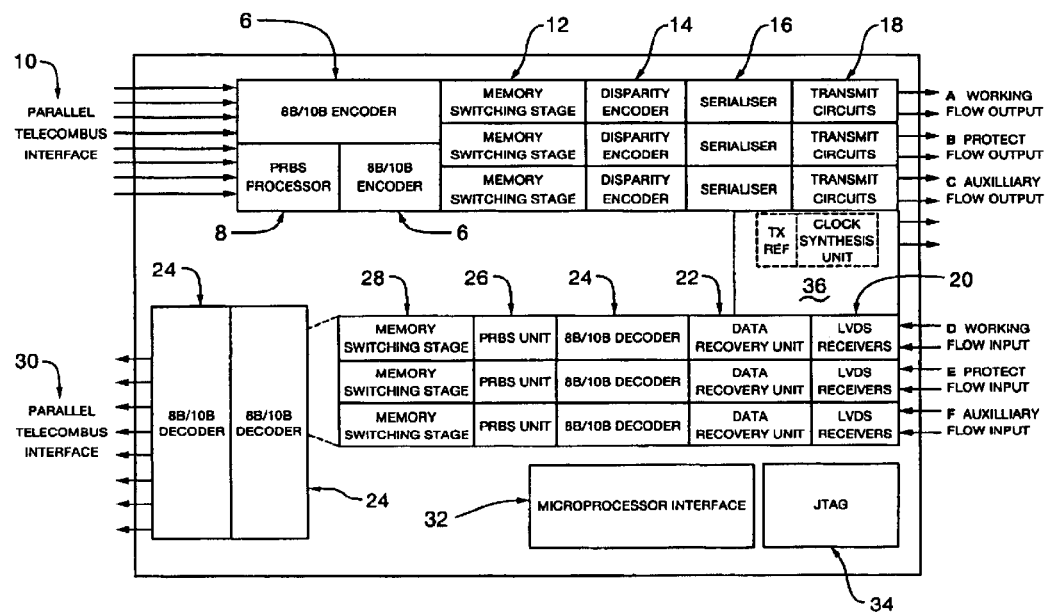
FIG. 8 is a block diagram representation of the internal structure of a TBS.

FIG. 8 shows the internal structure of an exemplary TBS. The TBS has two separate data paths: one from the line (left) side to the system (right) side (upper portion of FIG. 8), and one from the system side to the line side (lower portion of FIG. 8). The line-to-system side begins with parallel Telecombus interface 10 and PRBS generators and monitors (for testing), which then presents the dataflow to three copies (respectively labelled "A", "B" and "C" in FIG. 8) of the following blocks (supporting the working, protection, and auxiliary flows): memory switching stage 12, disparity encoder 14, serializer 16, and transmit circuits 18. The system-to-line side begins with LVDS receivers 20, which pass data to data recovery units 22 (as in the TSE), then to 8b/10b decoders 24, then to PRBS units 26, then to memory switching stages 28, which feed parallel Telecombus interface 30. The system-to-line side is triplicated (and again labelled "A", "B" and "C") for the working, protection, and auxiliary paths, up to the parallel Telecombus interface. Microprocessor interface 32 is separate, but has bus-based access to registers throughout the data path. JTAG support and clock generation and analog reference signals are generated in separate blocks (34). Memory switches 12, 28 provide the ability to treat all four ports of the TBS as members of the same port grouping to support multi-planed fabrics and for multicast.

Figure 9:
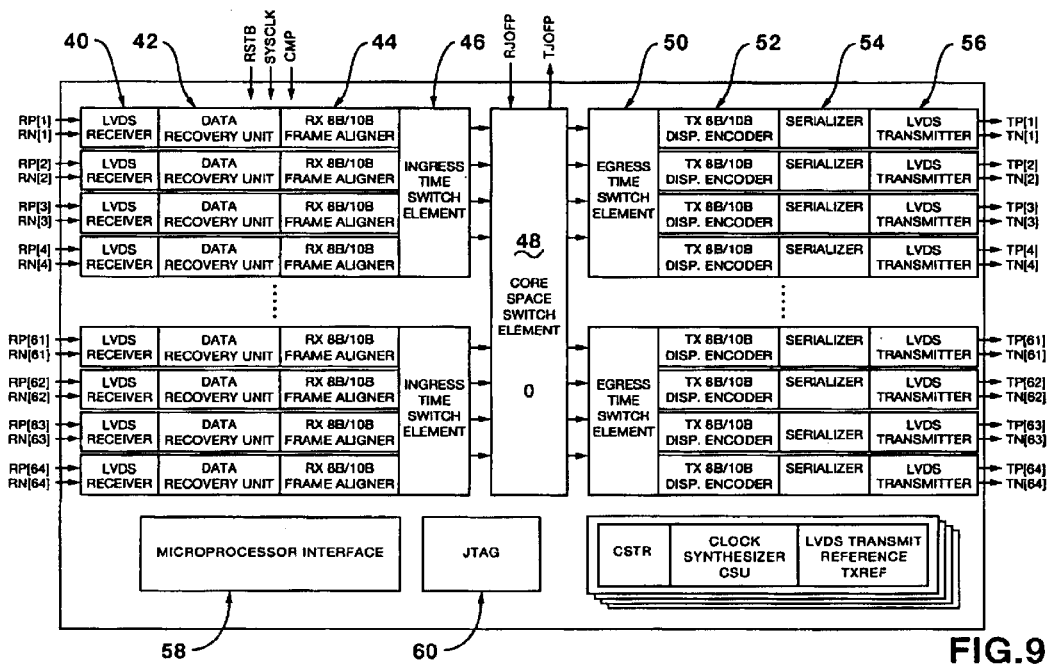
FIG. 9 is a block diagram representation of the internal structure of a TSE.

FIG. 9 shows the internal structure of an exemplary TSE. LVDS receivers 40 are shown on the left for all 64 ports. Data flows from LVDS Rx to data recovery units 42 (DRUs, which find 8b/10b codes) to frame aligners 44 (24 byte FIFOs which implement frame alignment and delay) to time switch units 46 (internally, the TSE gangs four time switch units into a single four-ported memory switch, identical to the memory switch used in the TBS; these memory units can be used as four parallel time switching stages) to core space switch 48, to egress time stages 50 (also implemented a memory stages), to data encoders 52 which implement the disparity correction logic, to serializers 54, to analog circuits 56 which drive the outgoing LVDS signals. Microprocessor interface 58 is separate, but has bus-based access to registers throughout the data path. JTAG support and clock generation and analog reference signals are generated in separate blocks (60). Time switch units 46 provide port groups of four ports that can arbitrarily rearrange input from any port and time position of the port group to any output port and time position of the port group. Such 4-port groupings provide the previously explained multicast benefits.

Fabric Control

The detailed mapping of ingress to egress grains in both the TSE and the TBS is controlled by the contents of various switching control memories. During each clock tick, the detailed movement of grains in all switching elements is controlled by the contents of these memories. Both the TSE and the TBS support dual switching control memories. At any time, one of these memories is active (in use, controlling the switching operation) and the other is in standby mode. The standby page of switching control memory can be written to through microprocessor interface 32 or 58 to record new switch settings to support a new pattern of connections. A control algorithm accepts connection requests, computes the required switch settings and writes these settings to the standby switching control memory pages in the various devices in the overall fabric.

The TSE and TBS are intended for use in building fabrics which are "non-blocking with re-arrangement"; this means that given some particular set of connections, a new connection request may block (there being no possible path through the fabric for the new connection, given the existing connections); however, "non-blocking with re-arrangement" means that there will be some set of paths for the total set of pre-existing and new connections, if only we are willing to re-arrange the pre-existing set of connections. Use of this paradigm reduces the fabric costs (as compared to a fabric which is "non-blocking without re-arrangement", but adds the requirement that the overall switching system permit the re-connection of existing connections during their operation. It is a standard requirement that any such re-connection occur without causing any loss (being "hitless") on any connection. Thus, the active switching control memory pages in a fabric may contain connection patterns which will be re-arranged (sent on different time/space paths) in the set of connections recorded in the standby switching control pages. It is necessary to support a switch-over from the currently active switching control pages to the currently standby and next active switching control pages without causing any loss of grains on any existing connections.

The TSE and TBS support this requirement in the following way: once the new set of connections have been written into all required standby switching control pages, a central controller asserts a global change-switching-control-memory-pages signal. This signal is asserted approximately mid-way between successive global start-of-frame signals. Each TSE and TBS records this request, but delays their local page change until their local start-of-frame time, based on their individual start-of-frame delay register. Thus, changes of switching control pages ripple through the fabric, from ingress side to egress side, as start-of-frame times occur at each successive fabric stage. This assures that the last grain on each connection in one frame will be routed consistently with one switching control memory page and the first grain of those connections will be routed consistently with the next switching control memory page; as both switching control memory pages route existing connections from the same time/space position and to the same time/space position (albeit, via differing intermediate time/space paths), those connections which are re-arranged do not suffer any loss or corruption. This allows arbitrary re-connection of existing connections, and thereby allows the less expensive class of "non-blocking with re-arrangement" fabrics to be employed.

Nothing in the above prevents the use of the TSE and the TBS from use in "non-blocking without re-arrangement" fabrics.

DETAILED DESCRIPTION

The invention will now be described in greater detail, with reference to the accompanying drawings.

A "switching fabric" is the internal interconnect architecture used by a switching device, such as the FIG. 1 transmission switching element (TSE), to redirect data from one of the device's input ports to one of the device's output ports. The FIG. 1 TSE has 64 low voltage differential signal (LVDS) ports designated LVDS #0, LVDS #1, . . . LVDS #63. This is represented by the expression TSEports={64}. Each LVDS port carries one STS-12 signal link. The TSE has an STS-12 granularity time slot interchange (TSI) stage on each ingress and each egress STS-12 link. ("Granularity" represents the size of operations done by a process between communications events. A fine grained process may perform only a few arithmetic operations between processing one message and the next, whereas a coarse grained process may perform millions.) A 64×64 space switch is coupled between the TSE ingress and egress stages.

Figure 2:
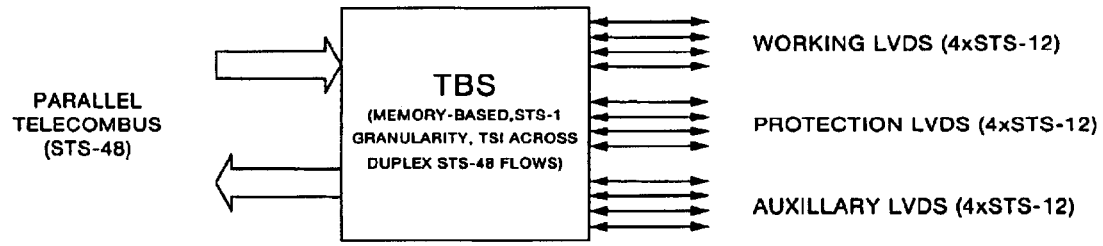
FIG. 2 schematically depicts a telecommunications bus serializer (TBS) having four "working" LVDS ports, four "protection" LVDS ports, and four "auxiliary" LVDS ports.

Switching devices which incorporate telecommunications bus serializer (TBS) functionality have 4 "working" STS-12 LVDS ports, as shown in FIG. 2. This functionality is represented by the expression TBSports={4}. The FIG. 2 TBS supports two uni-directional memory switching stages: one from an STS-48 parallel Telecombus to the four working STS-12 LVDS ports; with the other memory switch operating on the reverse path. The FIG. 2 TBS also has four "protection" and four "auxiliary" LVDS ports, but these are unaffected by the present invention and need not be discussed further.

A TSE fabric has an odd number of TSE stages. Only TSE fabrics having either 1 or 3 TSE stages are considered herein. This is represented by the expression stages={1, 3}.

A 1-stage fabric has a depth of 1 TSE. A 3-stage fabric can have a depth of 2 or more TSEs due to the fanout possible between each successive stage, with the fanout being determined as a power-of-two, limited by the value of the variable TSEports. This is represented by the expression depth={1, 2, 4, ... TSEports$^p$}, where p=stages/2.

A TSE fabric may have any power-of-two number of planes, limited by the value of the variable TBSports. This is represented by the expression planes={1, 2, 4, ..., TBSports}.

Figure 3:
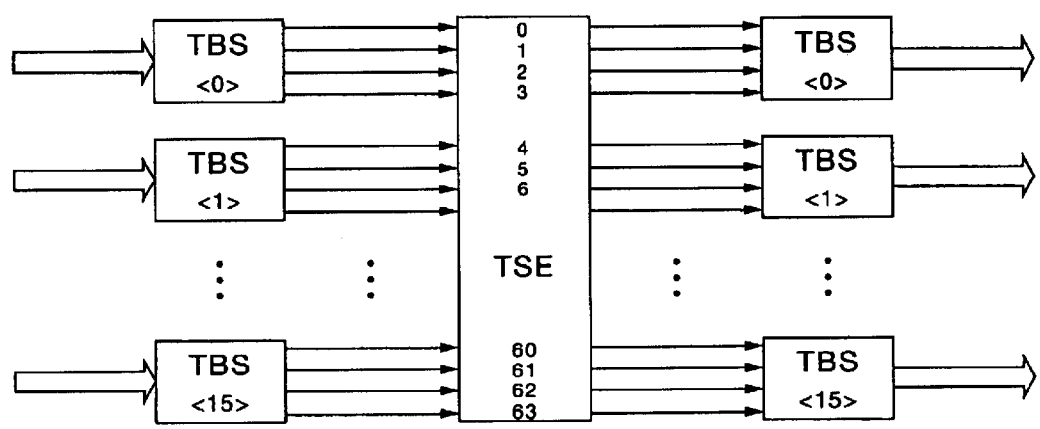
FIG. 3 schematically depicts a TSE fabric having 1 plane, 1 stage and a depth of 1.

The foregoing definitions make it possible to characterize any standard TSE fabric by a triple defining the number of planes and stages, and the depth, of the fabric in question. This is represented by the expression fabric=<planes, stages, depth>. FIGS. 3–7 illustrate exemplary TSE fabrics formed in accordance with the invention. In FIGS. 3-7, ingress-to-egress traffic is shown flowing left-to-right. Each TBS is represented twice: once to depict its ingress role, and once again to depict its egress role. Thus, FIG. 3 depicts two blocks labelled TBS<0>, two blocks labelled TBS<1>, etc.

Figure 4:
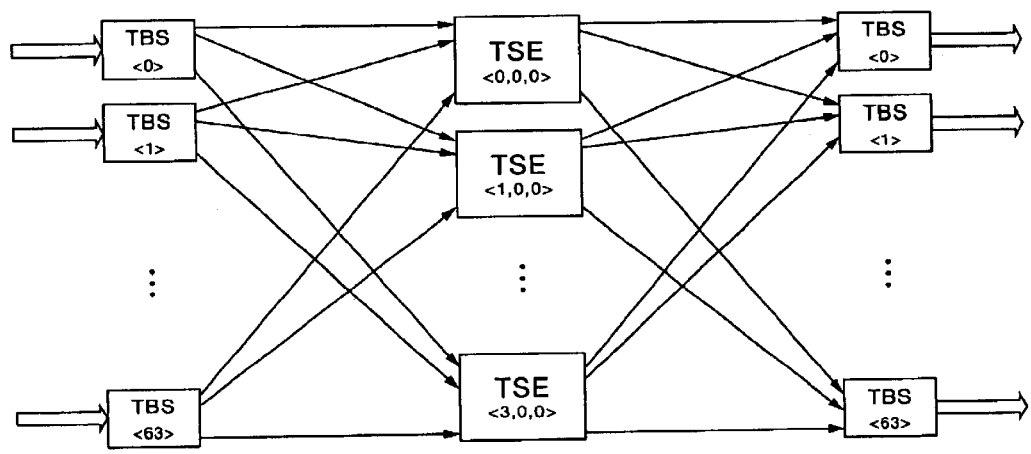
FIG. 4 schematically depicts a TSE fabric having 4 planes, 1 stage and a depth of 1.

The number of TSEs in a TSE fabric is determined by multiplying the values of the variables planes, depth, and stages. This is represented by the expression TSEcount=planes*depth*stages. For example, FIG. 3 depicts a TSE fabric having 1 plane, 1 stage and a depth of 1. Accordingly, the FIG. 3 fabric has a TSEcount=1*1*1=1, reflected in FIG. 3 by the depiction of a single TSE. By contrast, FIG. 4 depicts a TSE fabric having 4 planes, 1 stage and a depth of 1, yielding a TSEcount=4*1*1=4, reflected in FIG. 4 by the depiction of 4 TSEs. The previously explained <planes, stages, depth> characterization is used to designate the FIG. 4 TSEs as TSE <0,0,0> for the 1$^{st}$ plane, TSE <1,0,0> for the 2$^{nd}$ plane, TSE <2, 0,0> for the 3$^{rd}$ plane, and TSE <3,0,0> for the 4$^{th}$ plane, although TSE <2,0,0> is not shown in FIG. 4.

The number of TBSs in a TSE fabric is determined by multiplying the values of the variables planes, depth, and TSEports, divided by the value of the variable TBSports. This is represented by the expression TBScount=planes*depth*TSEports/TBSports. For example, the 1 plane, 1 stage, depth 1 FIG. 3 fabric has 64 TSEports (labelled 0,1, ..., 63 on the single TSE shown in FIG. 3); and, 4 TBSports (i.e. each TBS has 4 "working" STS-12 LVDS ports, as previously explained). This yields a TBScount=1*1*64/4=16, reflected in FIG. 3 by the representation of 16 TBSs labelled TBS<0>, TBS<1> ... TBS<15>. The 4 plane, 1 stage, depth 1 fabric of FIG. 4 also has 64 TSEports (i.e. 4 TSEs, each having 64 TSEports); and, 4 TBSports per TBS This yields a TBScount=4*1*64/4=64, reflected in FIG. 4 by the representation of 64 TBSs labelled TBS<0>, TBS<1> ... TBS<63>.

Each TSE fabric has a characteristic number of LVDS ports determined by multiplying the values of the variables planes, depth, and TSEports. This is represented by the expression Fabric-LVDSports=planes*depth*TSEports. Thus, the 1 plane, 1 stage, depth 1, 64 TSE-port FIG. 3 fabric has a total of 1*1*64=64 LVDS ports. As previously mentioned, these 64 ports are labelled 0,1, ... ,63 on the single TSE shown in FIG. 3. The aggregate bandwidth of a TSE fabric is determined by multiplying the characteristic bandwidth of each LVDS port by the total number of such ports in the fabric (i.e. FabricLVDSports). Each LVDS port carries one 0.622 Mb/s STS-12 signal link, so the fabric's aggregate bandwidth is FabricLVDSports*0.622 Mb/s. Accordingly, the aggregate bandwidth of the FIG. 3 TSE fabric is 64*0.622 Mb/s=40 Gb/s. The 4 plane, 1 stage, depth 1, 64 TSEport FIG. 4 fabric has a total of 4*1*64=256 LVDS ports, giving the FIG. 4 fabric an aggregate bandwidth of 256*0.622 Mb/s=160 Gb/s.

Figure 5:
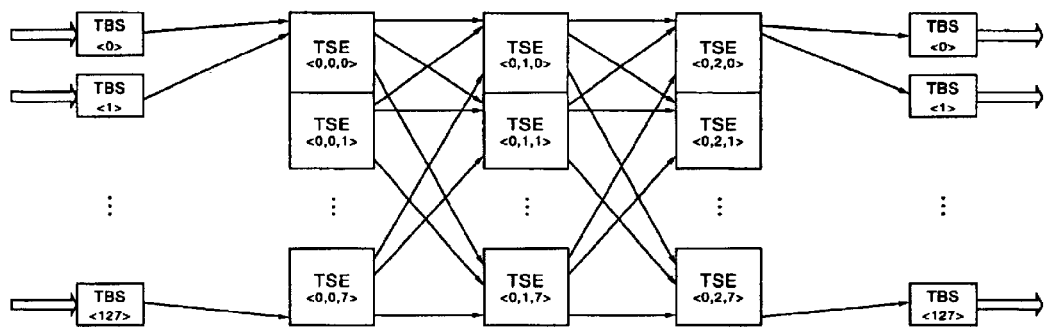
FIG. 5 schematically depicts a TSE fabric having 1 plane, 3 stages and a depth of 8.

FIG. 5 depicts a TSE fabric having 1 plane, 3 stages and a depth of 8, yielding a TSEcount=1*3*8=24. The 3 stage characteristic is represented in FIG. 5 by the 3 columns of TSEs. The depth of 8 characteristic is represented by the depiction of 8 TSEs in each one of the 3 columns of TSEs. The <planes, stages, depth> characterization is again used to designate each of the FIG. 5 TSEs. Thus, TSE <0,0,0> designates the TSE for the 1$^{st}$ plane, 1$^{st}$ stage and 1$^{st}$ depth; TSE <0,1,1> designates the TSE for the 1$^{st}$ plane, 2$^{nd}$ stage and 2$^{nd}$ depth; TSE <0,2,7> designates the TSE for the 1$^{st}$ plane, 3$^{rd}$ stage and 8$^{th}$ depth; etc. The 1 plane, 3 stage, depth 8 fabric of FIG. 5 has 64 TSEports (i.e. 24 TSEs, each having 64 TSEports); and, 4 TBSports per TBS. This yields a TBScount=1*8*64/4=128, reflected in FIG. 5 by the representation of 128 TBSs labelled TBS<0>, TBS<1> ... TBS<127>. The FIG. 5 fabric has a total of 1*8*64=512 LVDS ports, giving the FIG. 5 fabric an aggregate bandwidth of 512*0.622 Mb/s=320 Gb/s.

Figure 6:
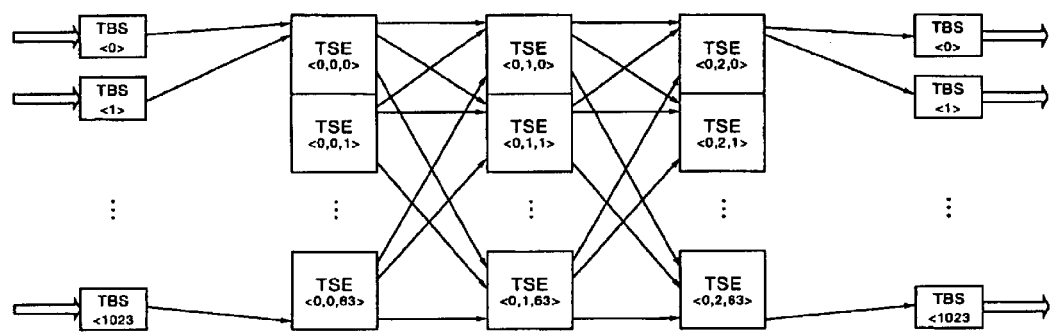
FIG. 6 schematically depicts a TSE fabric having 1 plane, 3 stages and a depth of 64.

FIG. 6 depicts a TSE fabric having 1 plane, 3 stages and a depth of 64, yielding a TSEcount=1*3*64=192. The 3 stage characteristic is again represented by the 3 columns of TSEs in FIG. 6, with the depth of 64 characteristic represented by depiction of 64 TSEs in each one of the 3 columns of TSEs. The <planes, stages, depth> characterization is again used to designate each of the FIG. 6 TSEs. Thus, TSE <0,0,0> designates the TSE for the 1$^{st}$ plane, 1$^{st}$ stage and 1$^{st}$ depth; TSE <0,1,1> designates the TSE for the 1$^{st}$ plane, 2$^{nd}$ stage and 2$^{nd}$ depth; TSE <0,2,63> designates the TSE for the 1$^{st}$ plane, 3$^{rd}$ stage and 64$^{th}$ depth; etc. The 1 plane, 3 stage, depth 64 fabric of FIG. 6 has 64 TSEports (i.e. 192 TSEs, each having 64 TSEports); and, 4 TBSports per TBS. This yields a TBScount=1*64*64/4=1,024, reflected in FIG. 6 by the representation of 1,024 TBSs labelled TBS<0>, TBS<1> ... TBS<1023>. The FIG. 6 fabric has a total of 1*64*64=4,096 LVDS ports, giving the FIG. 6 fabric an aggregate bandwidth of 4,096*0.622 Mb/s=2,560 Gb/s.

Figure 7:
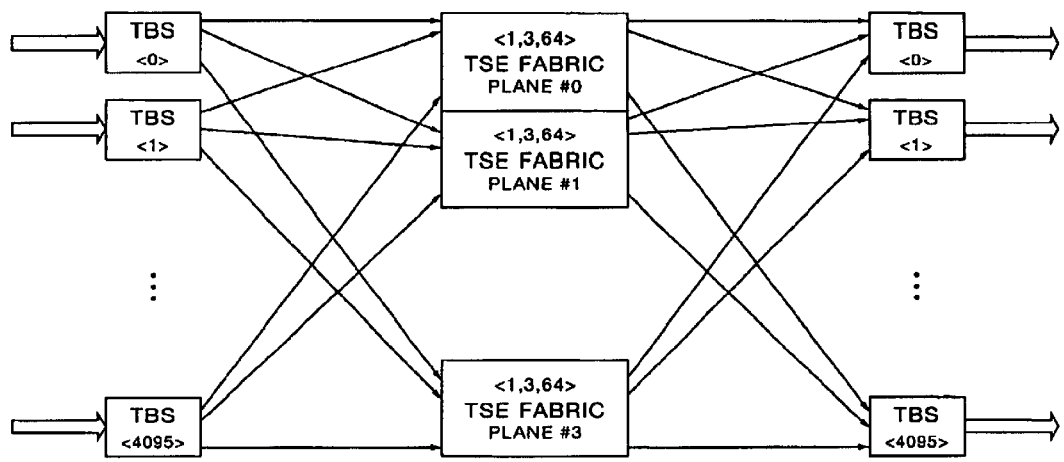
FIG. 7 schematically depicts a TSE fabric having 4 planes, 3 stages and a depth of 64.

FIG. 7 depicts a TSE fabric having 4 planes, 3 stages and a depth of 64, yielding a TSEcount=4*3*64=768. The 4 plane characteristic is represented by the blocks labelled "TSE Fabric Plane #0", "TSE Fabric Plane #1" and "TSE Fabric Plane #3" ("TSE Fabric Plane #2" is not shown). Each one of the "TSE Fabric Plane" blocks shown in FIG. 7 contains a complete 1 plane, 3 stage, depth 64 TSE fabric as illustrated in FIG. 6 and described above. This is schematically indicated in FIG. 7 by the label <1,3,64> on each one of the "TSE Fabric Plane" blocks. The 4 plane, 3 stage, depth 64 fabric of FIG. 7 has 64 TSEports (i.e. 768 TSEs, each having 64 TSEports); and, 4 TBSports per TBS. This yields a TBScount 4*64*64/4=4,096, reflected in FIG. 7 by the representation of 4,096 TBSs labelled TBS<0>, TBS<1> ... TBS<4095>. The FIG. 7 fabric has a total of 4*64*64=16,384 LVDS ports, giving the FIG. 7 fabric an aggregate bandwidth of 16,384*0.622 Mb/s=10,240 Gb/s.

The following Table summarises the previously explained characteristics of the TSE fabrics of FIGS. 3–7.

| FIG. | Planes | Stages | Depth | TSE Count | TBS Count | Fabric LVDS Ports | Bandwidth Gb/s |
|---|---|---|---|---|---|---|---|
| 3 | 1 | 1 | 1 | 1 | 16 | 64 | 40 |
| 4 | 4 | 1 | 1 | 4 | 64 | 256 | 160 |
| 5 | 1 | 3 | 8 | 24 | 128 | 512 | 320 |
| 6 | 1 | 3 | 64 | 192 | 1024 | 4096 | 2560 |
| 7 | 4 | 3 | 64 | 768 | 4096 | 16,384 | 10,240 |

Each TSE has an address, determined by the tuple: TSEaddress=<0 ... plane-1, 0 ... stage-1, 0 ... depth-1>. The egress/ingress TSE LVDS ports have addresses: LVDSegressPortAddress=<0 ... plane-1, 0 ... stage-1, 0 ... depth-1, 0 ... 63, egress>; and, LVDSingressPortAddress=<0 . . . plane-1, 0 . . . stage-1, 0 . . . depth-1, 0 . . . 63, ingress> respectively.

3 stage fabrics like those of FIGS. 5 and 6 have internal, TSE-to-TSE connections from the egress side of one stage to the ingress side of the next stage, specified by the mapping:

<p, i, d, pn, egress>::
<p, i+1, pn div portsPerTSE, (d*portsPerTSE)+(pn mod portsPerTse), ingress>
where ports PerTSE=TSEports div depth
for p in 0 . . . planes–1
for i in 0 . . . stages–1
for d in 0 . . . depth–1
for pn in 0 . . . TSEports–1

In the above mapping, "egress" indicates that the address specified is for an egress port of the TSE, "ingress" indicates that the address is for an ingress port of a TSE, "TSEports" is the total number of ingress or egress ports on a TSE, "planes" is the number of planes in the composite fabric, "stages" is the number of columns of TSEs in the composite fabric, "depth" is the number of TSEs per plane in the composite fabric, and "portsPerTSE" is the number of egress ports of every TSE in one stage that are connected to each TSE in the next stage. For example, <0,0,0,0, egress> is the address of the egress port defined by the $1^{st}$ TSEport of the $1^{st}$ plane, $1^{st}$ stage, at the $1^{st}$ depth. That egress port is mapped as aforesaid to the ingress port having address <0,0+1,0 div 8, (0*8)+(0 mod 8), ingress>=<0,1,0,0, ingress>. In other words, the $1^{st}$ egress port on TSE<0,0,0> is mapped to the $1^{st}$ ingress port on TSE<0,1,0>. As another example, <0,0,0,1, egress> is the address of the egress port defined by the $2^{nd}$ TSEport of the $1^{st}$ plane, $1^{st}$ stage at the $1^{st}$ depth. That egress port is mapped as aforesaid to the ingress port having address <0,0+1, 1 div 8, (0*8)+(1 mod 8), ingress>=<0,1,0,1, ingress>. In other words, the $2^{nd}$ egress port on TSE<0,0,0> is mapped to the $2^{nd}$ ingress port on TSE<0,1,0>. As a final example, <0,1,7,63, egress> is the address of the egress port defined by the $64^{th}$ TSEport of the $1^{st}$ plane, $2^{nd}$ stage at the $8^{th}$ depth. That egress port is mapped as aforesaid to the ingress port having address <0,1+1,63 div 8, (7*8)+(63 mod 8), ingress>=<0,2,7,63, ingress>.

A TSE fabric has a total of FabricLVDSports ingress and egress LVDS ports, described by the addresses <0 . . . FabricLVDSports-1, ingress> and <0 . . . FabricLVDSports-1, egress> respectively, with TBScount TBSs connected to these FabricLVDSports. For example, as previously explained, FabricLVDSports=512 for the FIG. 5 TSE fabric. Thus, that TSE fabric has 256 egress ports and 256 ingress ports.

TBS ports are connected to TSE ports as follows. In multi-plane fabrics, the TBS links are spread across the 2 or 4 planes of the TSE fabric, and successive TSEs fill successively higher numbered LVDS ports on successively higher numbered TSEs. Single plane fabrics are identical, except that each TBS occupies four ports on a TSE in the single fabric plane. For example, the FIG. 3 single plane fabric has 16 TBSs, each of which has 4 LVDS ports. The 4 egress ports of TBS<0> are connected to ingress ports 0–3 of the single TSE; the TSE's egress ports 0–3 are connected to the 4 egress ports of TBS<0>; the 4 egress ports of TBS<1> are connected to the TSE's ingress ports 4–7; the TSE's egress ports 4–7 are connected to the 4 egress ports of TBS<1>; etc.

By contrast, the 4 plane fabric of FIG. 4 has 64 TBSs, each of which has 4 LVDS ports. The $1^{st}$ egress port of TBS<0> is connected to the $1^{st}$ ingress port of TSE<0,0,0>; the $2^{nd}$ egress port of TBS<0> is connected to the $1^{st}$ ingress port of TSE<1,0,0>; the $3^{rd}$ egress port of TBS<0> is connected to the $1^{st}$ ingress port of TSE<2,0,0>; and, the $4^{st}$ egress port of TBS<0> is connected to the $1^{st}$ ingress port of TSE<3,0,0>. The $1^{st}$ egress port of TBS<1> is connected to the $2^{nd}$ ingress port of TSE<0,0,0>; the $2^{nd}$ egress port of TBS<1> is connected to the $2^{nd}$ ingress port of TSE<1,0,0>; the $3^{rd}$ egress port of TBS<1> is connected to the $2^{nd}$ ingress port of TSE<2,0,0>; the $4^{th}$ egress port of TBS<1> is connected to the $2^{nd}$ ingress port of TSE<3,0,0>; etc. Similarly, the $1^{st}$ egress port of TSE<0,0,0> is connected to the $1^{st}$ ingress port of TBS<0>; the $2^{nd}$ egress port of TSE<0,0,0> is connected to the $1^{st}$ ingress port of TBS<1>; the $3^{rd}$ egress port of TSE<0,0,0> is connected to the $1^{st}$ ingress port of TBS<2>; . . . the $64^{th}$ egress port of TSE<0,0,0> is connected to the $1^{st}$ ingress port of TSB<63>; the $1^{st}$ egress port of TSE<1,0,0> is connected to the $2^{nd}$ ingress port of TBS<0>; the $2^{nd}$ egress port of TSE<1,0,0> is connected to the $2^{nd}$ ingress port of TBS<1>; the $3^{rd}$ egress port of TSE<1,0,0> is connected to the $2^{nd}$ ingress port of TBS<2>; . . . the $64^{th}$ egress port of TSE<1,0,0> is connected to the $2^{nd}$ ingress port of TSB<63>; etc.

The wiring for TBS ports can be described as a triple consisting of a TBS address, the port number on the TBS, and an indication of the direction of the port (i.e. "ingress" indicates that the connection delivers data from a TBS to a TSE, and "egress" indicates that the connection delivers data from a TSE to a TBS). The following equation provides the TBS egress to TSE wiring relationship:

<a, e, egress>::
<e div portsPerPlane, 0, (a*portsPerPlane) div TSEports, ((a*portsPerPlane) mod TSEports+e mod portsPerPlane, ingress>
where portsPerPlane=TBSports div planes
for a in 0 . . . TBScount–1
for e in 0 . . . TBSports–1

The following equation provides the TSE to TBS ingress wiring relationship:

<p, stages–1, d, pn, egress>::
<((d*TSEports)+pn) div portsPerPlane, pn mod portsPerPlane+p*portsPerPlane, ingress>
where portsPerPlane=TBSports div planes
for p in planes–1
for d in 0 . . . depth–1
for pn in 0 . . . TSEports–1

The wiring relationships described above ensure the creation of rearrangeably non-blocking switching fabrics. Constraints of physical wiring, however, may make it difficult to wire components of a composite fabric exactly following the wiring equations. For example, pin placement on the TBS and TSE as well as circuit board placement of the devices may make it more attractive to wire ports together in a manner different from that prescribed by the above wiring equations. Such modifications due to physical constraints are acceptable, provided that the number of TSEs and TBS are correct and the number of ports connected between each device is in agreement with the wiring equations. In this case, the only difference between the wiring equations and the actual wiring is that port numbers at specific devices may not be as specified in the wiring equations. A lookup table can be used to translate between "actual" ports and "conceptual" (i.e. "logical") ports. For example, according to the TBS egress to TSE wiring relationship, TBS 0's egress port 0 is wired to TSE 0's ingress port 0. However, actual wiring of those ports may be precluded by constraints as noted above, possibly making it more convenient to wire TBS 0's egress port 0 to TSE 0's ingress port 37. A lookup table entry (FIG. 10) can be used to translate TSE 0's actual ingress port 37 to conceptual ingress port 0. In this way, wiring relationships remain correct with the modifications of port numbers for wiring convenience.

Figure 10:
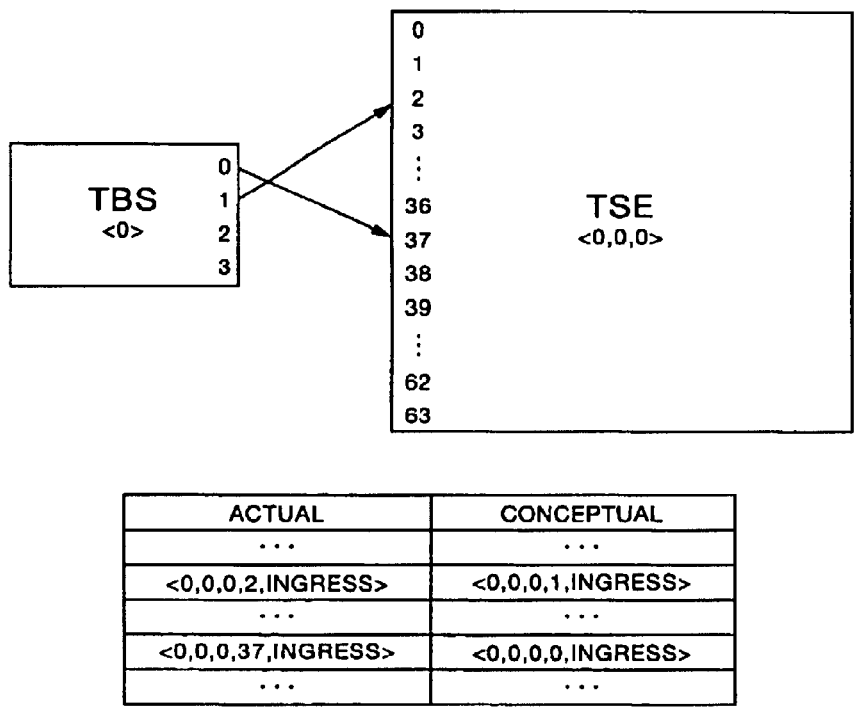
FIG. 10 schematically depicts the arbitrary wiring of ports between an exemplary TBS and TSE together with an actual to conceptual port translation table.
Figure 11:
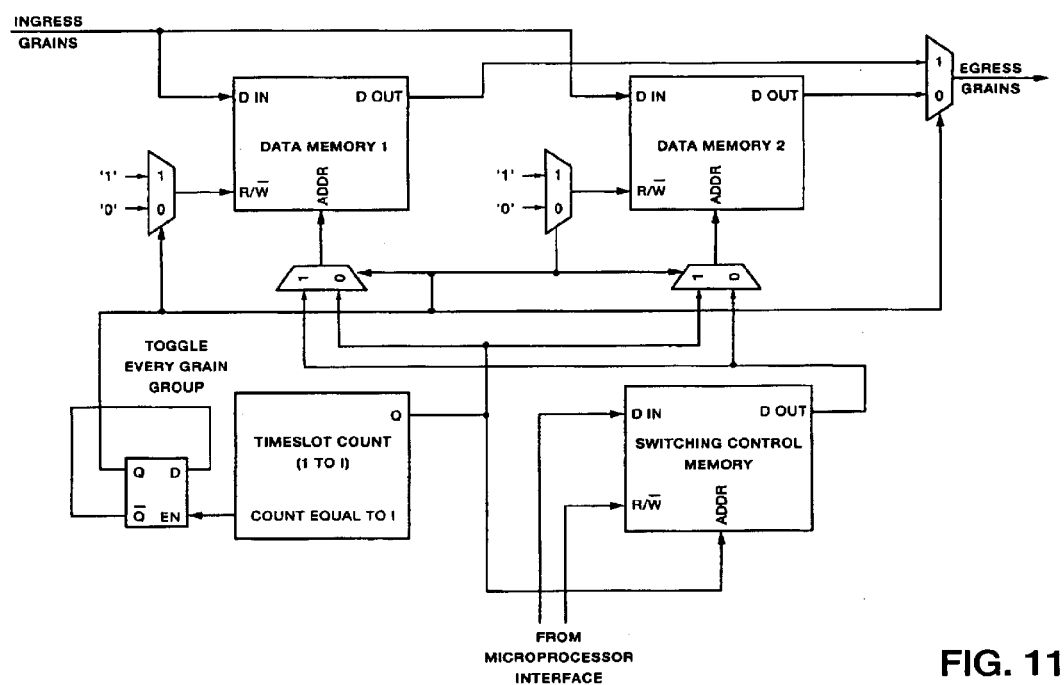
FIG. 11 depicts one possible implementation of a time switch stage.
Figure 12:
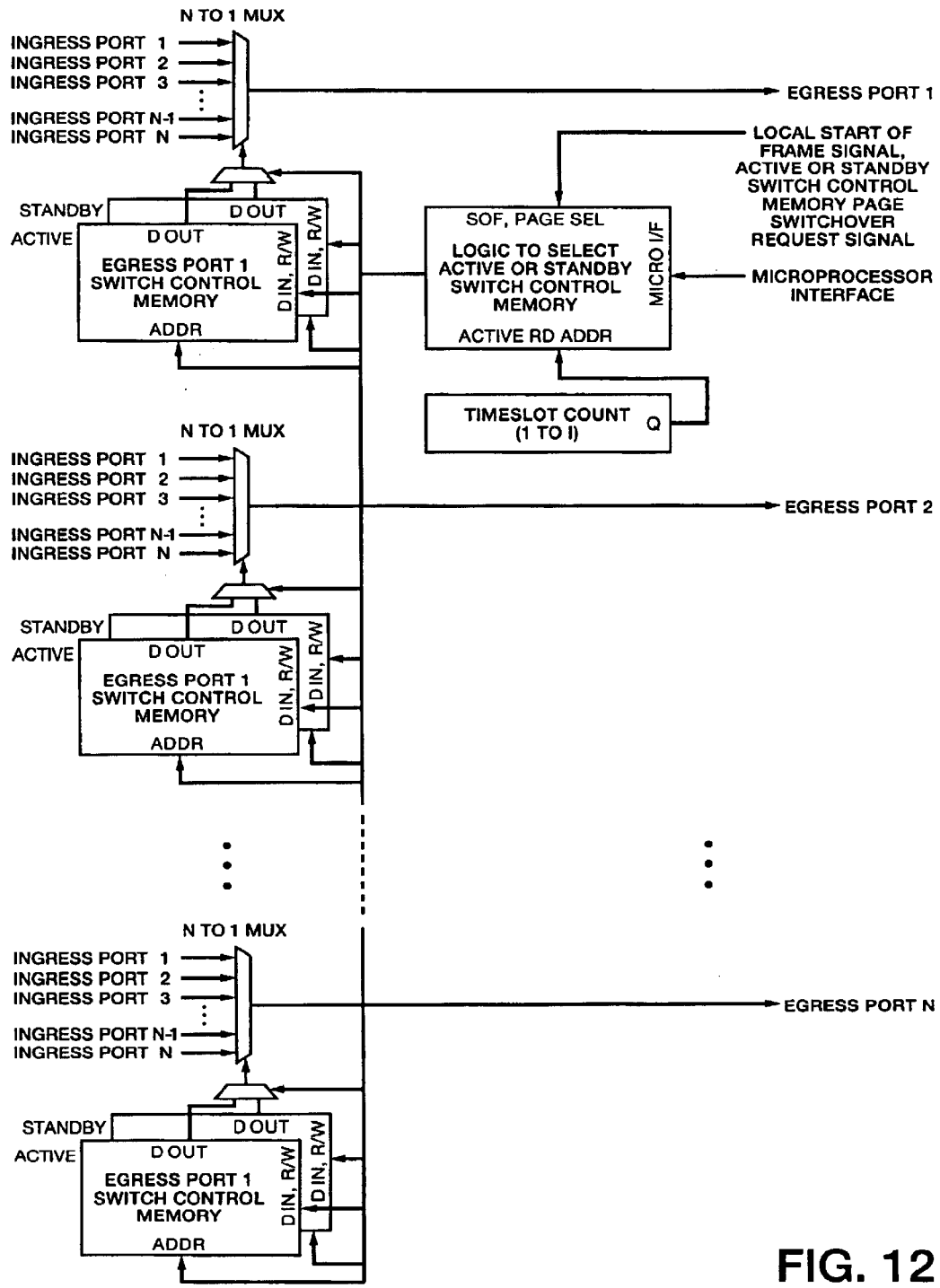
FIG. 12 depicts one possible implementation of a space switch stage.

The upper portion of FIG. 10 shows the port wiring of a specific TBS to a specific TSE. The lower half of FIG. 10 shows a lookup table for translating actual wiring to conceptual wiring. The TBS and TSE in FIG. 10 are intended to be part of a two plane fabric. In such a fabric, the first two ports of a TBS are wired to the first TSE of the plane. According to the wiring relationships provided above, port 0 of TBS <0> should be wired to port 0 of TSE <0,0,0> and port 1 of TBS <0> should be wired to port 1 of TSE <0,0,0>. The actual wiring shown connects port 0 to port 37 and port 1 to port 2. The table in FIG. 10 translates actual port 37 to conceptual port 0; and, translates actual port 2 to conceptual port 1.

Persons skilled in the art will understand that implementation specific considerations must be taken into account in constructing switch fabrics incorporating specific features of the invention. For example, considerations to be taken into account in relation to data recovery units 42 (FIG. 9) include clock alignment and bit recovery using a digital, multi-clock-phase PLL and presentation of recovered bits in groups of ten (a word) to frame aligner 44 on a clock edge (90 MHz) faster than the core clock speed (77.76 MHz), but with gaps marked by the absence of a data ready signal.

Figure 13:
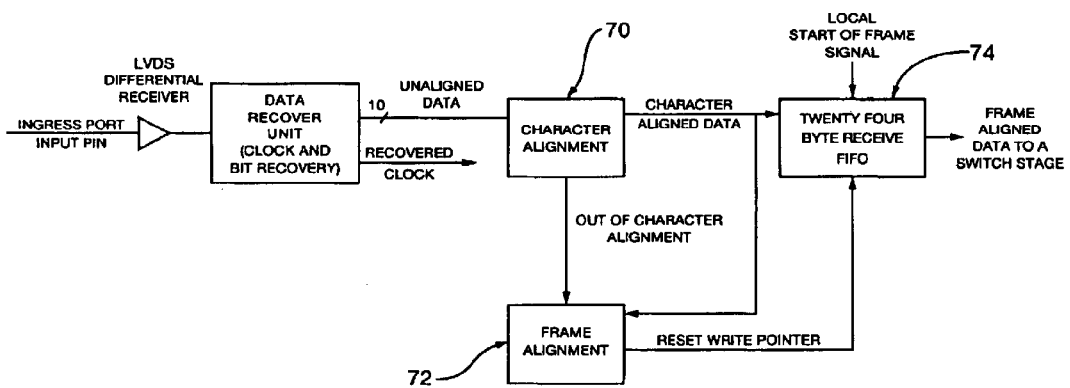
FIG. 13 is a block diagram representation of an exemplary receiver.

Each one of frame aligners 44 depicted in FIG. 9 may comprise character alignment block 70, frame alignment block 72, and 24-byte receive FIFO 74, as shown in FIG. 13. Character alignment block 70 maintains the current character alignment state (in or out of character alignment) and outputs data that is character aligned on 10 bit boundaries. Frame alignment block 72 checks the character aligned data for occurrences of the comma character and uses the information to maintain the frame alignment state and frame counter for the receiver. 24-byte receive FIFO 74 stores character aligned data and outputs data that is frame-aligned to the local start-of-frame signal.

Figure 14:
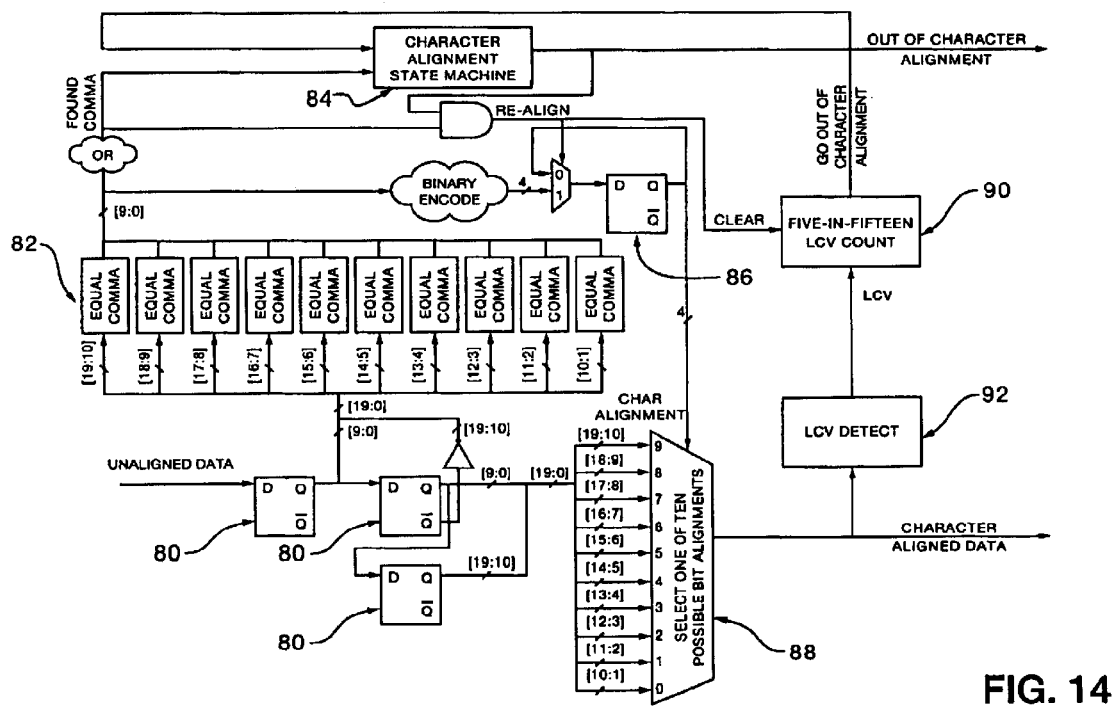
FIG. 14 depicts an implementation of a receiver character alignment block.
Figure 16:
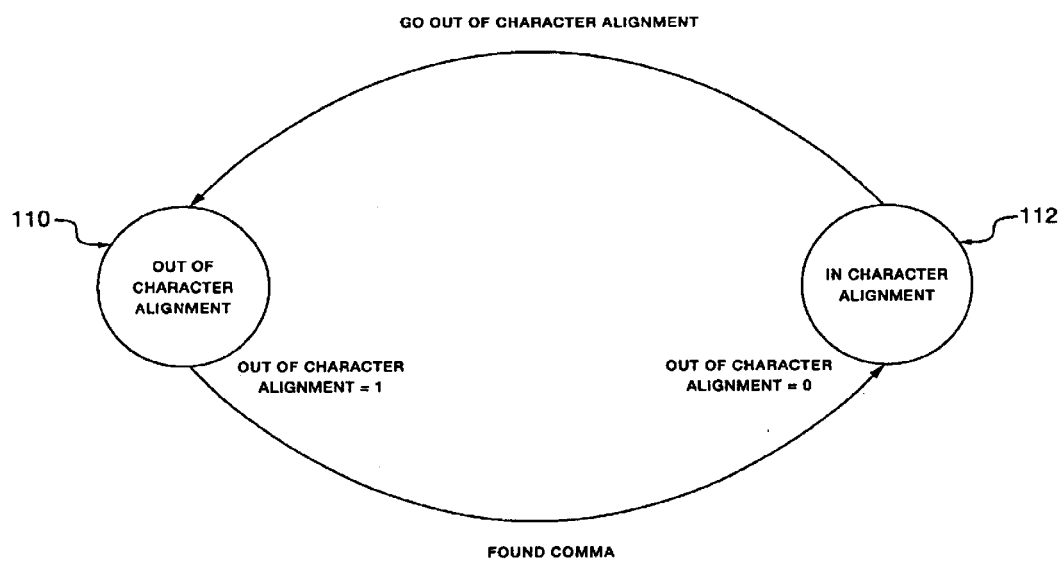
FIG. 16 depicts the character alignment state machine.

FIG. 14 depicts an exemplary implementation of character alignment block 70 of FIG. 13; and, FIG. 16 provides the state diagram for character alignment state machine 84 shown in FIG. 14. Twenty bits of data are stored in registers 80. "In character alignment" state 112 is achieved by searching for the comma character in each of the 10 possible bit alignments over the 20 bits 82. The 4-bit binary encoded character alignment stored in register 86 is updated if the character alignment state machine 84 is in the "out of character alignment" state 110 and if a comma character has been found in any of the 10 possible bit alignments. 10-to-1 multiplexor 88 selects character aligned data for output. The character aligned data is monitored for line code violations by LCV detect block 92. A count is maintained of the number of line code violations that occur within a window of successive characters. If five violations occur within a fifteen character window, character alignment state machine 84 is forced into "out of character alignment" state 110 by five-in-fifteen LCV count block 90.

Figure 15:
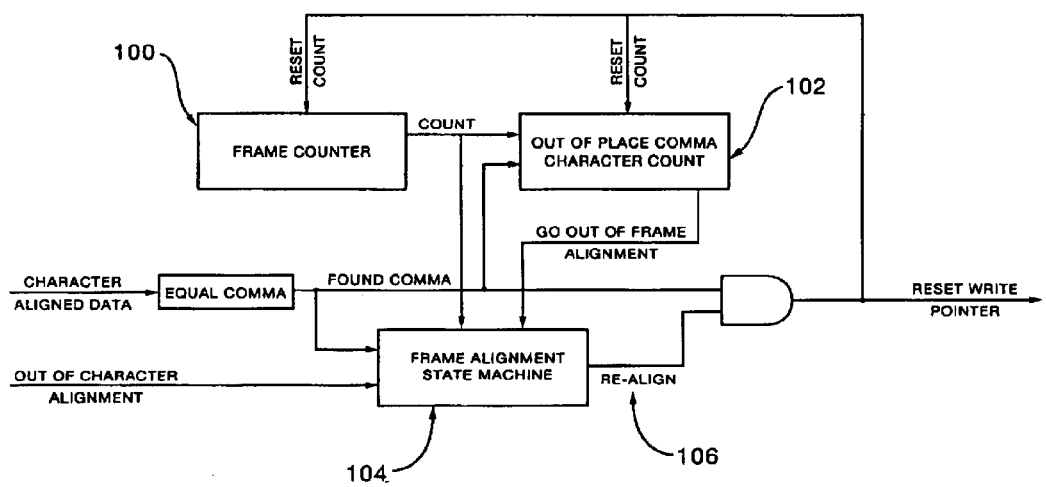
FIG. 15 depicts an implementation of a receiver frame alignment block.
Figure 17:
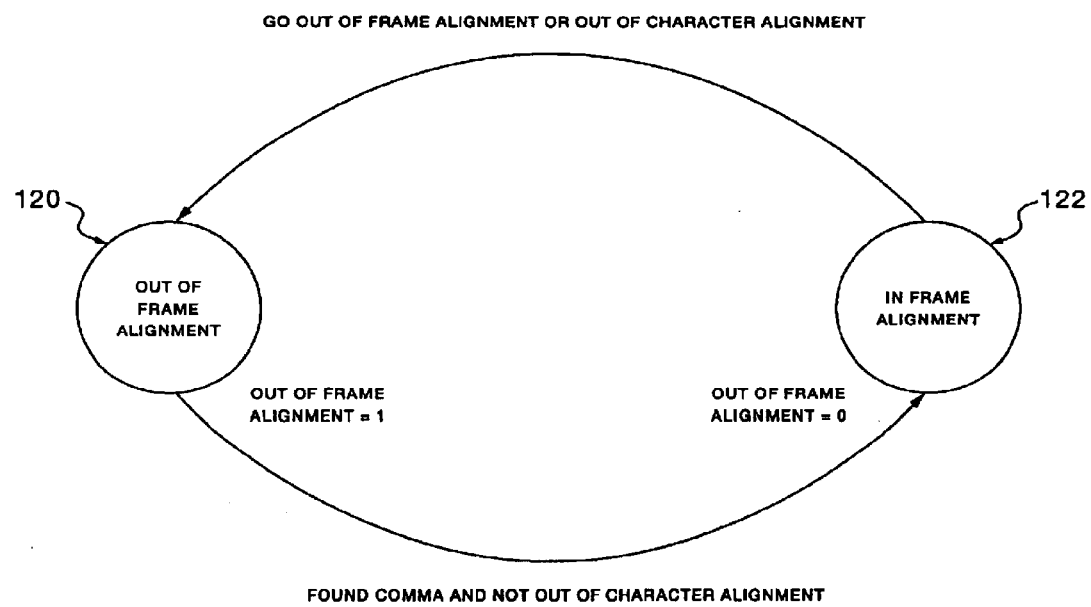
FIG. 17 depicts the frame alignment state machine.

FIG. 15 depicts an exemplary implementation of frame alignment block 72 of FIG. 13; and, FIG. 17 provides the state diagram for frame alignment state machine 104 shown in FIG. 15. Frame alignment block 72 maintains the frame alignment state such that the start-of-frame character always resides at the same location in the FIFO. Subsequent reads from the receive FIFO's are then synchronized to the local start-of-frame signal. Maintaining the frame alignment state requires frame counter 100, counter 102 (which counts the number of out of place comma characters), and frame alignment state machine 104. Frame alignment state machine is in one of two states, namely "out of frame alignment" state 120 or "in frame alignment" state 122, as shown in FIG. 17. When frame alignment block 72 is in "out of frame alignment" state 120 and character alignment state machine 84 is in "in character alignment" state 112, a single occurrence of the comma character in the character aligned data at the correct position in the frame (indicated by the "count" output by frame counter 100) causes a transition to "in frame alignment" state 122. Realign signal 106 is asserted when frame alignment state machine 104 is in "out of frame alignment" state 120 and a comma character is found, resulting in reset of frame counter 100, reset out of place comma character counter 102 and reset of the FIFO write pointer. Resetting the FIFO write pointer causes the receivers to naturally and quickly recover from any line/logic errors. Frame counter 100 is reset to the position of the comma character within the frame. Frame counter 100 increments by one for every character it receives, and wraps to 1 at the beginning of a frame. When frame alignment state machine 104 is in "in frame alignment" state 122, out of place comma character counter 102 maintains a count of the number of consecutive comma characters that were received at the incorrect position in a frame. If the number of consecutive out of place characters received exceeds two, or if character alignment state machine 84 is in "out of character alignment" state 110, frame alignment state machine 104 transitions to "out of frame alignment" state 120. When character alignment state machine 84 is in "out of character alignment" state 110 and frame alignment state machine 104 is in "out of frame alignment" state 120, the occurrence of a comma character in the character aligned data stream causes assertion of re-align signal 106, thereby resetting frame counter 100, out of place comma character count 102 and FIFO write pointer, with frame alignment state machine 104 remaining in "out of frame alignment" state 120.

Additional considerations applicable to the serial link receivers include use of additional, non-standard 8b/10b codes to mark both the high-order and low-order SONET structure in the TBS and relaxation of the concept of running disparity in 8b/10b codes to allow the addition of extra 8b/10b control characters which cause disparity errors in standard 8b/10b decoders.

Considerations applicable to the serial link transmitters include usage of a small clock domain FIFO which permits the digital core to ignore clock multiplier wander in the transmitter circuits; and, recomputation to permit decoupling of the transmitter from the digital core of 8b/10b codes after switching in time and/or space, to allow the running disparity of the transmitted stream to be corrected (within the looser constraints imposed by the addition of the five new 8b/10b control characters).

Considerations applicable to the TBS include usage of flip-flops and multiplexors to implement the memory switch stage (this can also be achieved by means of an embedded RAM, but the small amount of memory required is more efficiently implemented via flip-flops); usage of multiplexors and demultiplexers to incorporate PRBS logic blocks into the TBS data paths; usage of a uniformly synchronous logic core, operating at (77.76 MHz), an integer divisor (10) of the LVDS line rate (777.6 MHz); acceptance of start-of-frame signal from the line side parallel Telecombus as the start-of-frame delay for the first data into the TSE/TBS data path; usage of a binary counter to count 77.76 Hz clock ticks from the start of the global start-of-frame signal; usage of flip-flops as the switching control memory (embedded RAMs could also be used, but at the expense of greater VLSI area, given the small size of these control memories); and, usage of a microprocessor interface to set switching control registers and to access LVDS status and error counters.

Considerations and features applicable to the TSE include usage of multiplexors to implement the core space switch stage (tri-state devices could also be used, but would cause electrical drive problems); usage of flip-flops as the switching control memory (embedded RAMs could also be used, but at the expense of greater VLSI area, given the small size of these control memories); usage of a uniformly synchronous logic core, operating at (77.76 MHz), an integer divisor (10) of the LVDS line rate (777.6 MHz); usage of a binary counter to count 77.76 Hz clock ticks from the start of the global start-of-frame signal; usage of flip-flops and multiplexors to implement the time switch data memories (this can also be achieved by means of an embedded RAM, but the small amount of memory required is more efficiently implemented via flip-flops); and, usage of a microprocessor interface to set switch control memory values and to access LVDS status and error counters.

Persons skilled in the art will accordingly understand that the invention provides the following advantages:

usage of fast serial differential signalling (in particular, a variant of low-voltage differential signalling) for all intra-fabric communication;

usage of 8b/10b coding on such serial links to maintain adequate transition density, to detect byte alignment, to detect transmission errors, to identify SONET frame boundaries, and to distribute exact framing synchronization through the fabric;

usage of a single 8 kHz clock source for all clocking within the time and space fabric, coupled with an ability to absorb large amounts of clock skew and wander in various clock multipliers due to the use of a single global start-of-frame signal which is delivered, with large acceptable skew, to all components of the fabric;

delayed switching in each successive stage of the fabric until the delay from start-of-frame has resulted in all link FIFOs being prepared to contribute successive grains to the local synchronous switching process;

usage of dual switching control memories which allow one set of switch settings to be in operation while the other set of settings is available for recording the next set of connections;

synchronization of changes of the active switch control memory with the progress of start-of-frame indications through the fabric, which allows re-arrangement of existing connections without any loss of grains during the switching process, thereby supporting a re-arrangement-on-blocking fabric architectures and open path algorithms;

resynchronization of the serial streams at each switching device due to the fact that each device waits until the inputs are ready and then synchronously switches and transmits the streams;

division of the fabric into two related devices, the TSE and the TBS:
  the TSE being a compound fabric consisting of an ingress time stage, a core space stage, and an egress time stage,
  the TBS consisting of two memory switches, one in the ingress path and one in the egress path,
  and the TBS having separate start-of-frame delays for each switching path (ingress-to-egress and egress-to-ingress);

the ability to aggregate multistage fabrics of the TBS and TSE which may have redundant switching stages:
  the presence of possibly redundant stages allows the fabric stages to adapt to a wide variety of applications, including:
  usage of the TSE time stage in multiple TSE stage applications to reduce the difficulty of open path routing by decoupling the time orderings of the various TSE stages,
  usage of the TSE time stage to support multicast and protection applications;

the ability to use the generality of the TSE and the TBS to support an extremely wide range from fabric sizes, from 622 Mb/s using one TBS to 10 Tb/s using four planes of three stages of TSEs (and any odd number of TSE stages), each stage of TSEs having sixty-four TSEs (depth=64).

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A time:space:time switch fabric, comprising:
(a) a plurality of spatially distributed data switches, each one of said data switches further comprising:
   (i) a first plurality of ingress ports;
   (ii) a plurality of egress ports equal to said first plurality;
   (iii) a space switch for selectably spatially rearranging data transmission between any one of said ingress ports and any one of said egress ports;
   (iv) an ingress time switch coupled to an input of said space switch, said ingress time switch for selectably temporally rearranging data received on said ingress ports;
   (v) an egress time switch coupled to an output of said space switch, said egress time switch for selectably temporally rearranging data output by said space switch;
(b) a plurality of spatially distributed data serializers, each one of said data serializers further comprising:
   (i) an input bus for receiving signals to be routed through said switch fabric;
   (ii) an output bus for outputting signals routed through said switch fabric;
   (iii) a second plurality of egress ports, each one of said data serializer egress ports further comprising a high speed serial link selectably connectible to any one of said data switch ingress ports;
   (iv) a plurality of ingress ports equal to said second plurality, each one of said data serializer ingress ports further comprising a high speed serial link selectably connectible to any one of said data switch egress ports;
wherein:
   (i) said data switch ingress and egress ports and said data serializer ingress and egress ports further comprise a composite fabric of said data switches characterized by at least:
      (1) p planes, where p is a power-of-two integer less than or equal to said second plurality of said data serializer ingress and egress ports;
      (2) s stages, where s is an odd integer number;
      (3) a depth d, where d is a power-of-two integer less than or equal to said first plurality of said data switch ingress and egress ports;

said composite fabric comprising p*s*d inter-connected ones of said data switches;
  (ii) said data switch ingress ports of a first one of said stages are coupled to said data serializer egress ports;
  (iii) said data switch egress ports of an $s^{th}$ one of said stages are coupled to said data serializer ingress ports; and,
  (iv) said data switch egress ports of each $n^{th}$ one of said stages are coupled to data switch ingress ports of each $n+1^{th}$ one of said stages, where 1<n<s.

2. A switch fabric as defined in claim 1, wherein:
(a) each one of said data switches further comprises:
  (i) an active switch control memory for containing indicia defining currently active connections between selected ones of said ingress and egress ports for said one of said data switches;
  (ii) a standby switch control memory for containing indicia defining next active connections between selected ones of said ingress and egress ports for said one of said data switches;
(b) each one of said data serializers further comprises:
  (i) an active switch control memory for containing indicia defining currently active connections between selected ones of said ingress and egress ports for said one of said data serializers; and,
  (ii) a standby switch control memory for containing indicia defining next active connections between selected ones of said ingress and egress ports for said one of said data serializers;
said switch fabric further comprising a controller for switching control of each one of said data switches and each one of said data serializers between said active and standby switch control memories of said respective data switches and said data serializers.

3. A switch fabric as defined in claim 2, wherein:
(a) each one of said data switches further comprises a start-of-frame delay register for containing a start-of-frame time signal unique to said one of said data switches;
(b) each one of said data serializers further comprises a start-of-frame delay register for containing a start-of-frame time signal unique to said one of said data serializers;
(c) said switching control further comprises issuance by said controller of a global change-connection-memory-pages signal to every one of said data switches and to every one of said data serializers;
(d) upon receipt of said global change-connection-memory-pages signal, each one of said data switches delays said switching control between said respective active and standby switch control memories for a time interval corresponding to said start-of-frame time signal contained in said start-of-frame delay register of said one of said data switches; and,
(e) upon receipt of said global change-connection-memory-pages signal, each one of said data serializers delays said switching control between said respective active and standby switch control memories for a time interval corresponding to said start-of-frame time signal contained in said start-of-frame delay register of said one of said data serializers.

4. A switch fabric as defined in claim 1, wherein said egress ports of each one of said data switches in one of said stages are connected to said ingress ports of each one of said data switches in a sequentially next one of said stages in accordance with the equation:
<p, i, d, pn, egress>::
  <p, i+1, pn div portsPerTSE, (d*portsPerTSE)+(pn mod portsPerTSE), ingress>
  where portsPerTSE=TSEports div depth
  for p in 0 . . . planes−1
  for i in 0 . . . stages−1
  for d in 0 . . . depth−1
  for pn in 0 . . . TSEports−1
wherein egress is an output port address of said data switch, ingress is an input port address of said data switch, i is an integer representative of one of said stages, pn is an integer representative of a pair comprising one of said data switch ingress ports and one of said data switch egress ports, TSEports is an integer representative of the total number of said data switch ingress and egress ports for each one of said data switches, planes is an integer representative of the total number of said planes, stages is an integer representative of the total number of said stages, depth is an integer representative of the total number of said depths, and portsPerTSE is an integer representative of the total number of egress ports in every one of said data switches within a first one of said stages connected to each one of said data switches within a sequentially next one of said stages.

5. A switch fabric as defined in claim 4, wherein said data serializer egress ports are connected to said data switch ingress ports in accordance with the equation:
<a, e, egress>::
  <e div portsPerPlane, 0, (a*portsPerPlane) div TSEports, ((a*portsPerPlane) mod TSEports+e mod portsPerPlane, ingress>
  where portsPerPlane=TBSports div planes
  for a in 0 . . . TBScount−1
  for e in 0 . . . TBSports−1
wherein portsPerPlane is the number of said data serializer ports in each one of said planes, TBSports is the number of said data serializer ingress and egress port pairs for each one of said data serializers, TBScount is the total number of said data serializers, a is an integer representative of an address of one of said data serializers, and e is an integer representative of a port on said one of said data serializers.

6. A switch fabric as defined in claim 5, wherein said data switch egress ports are connected to said data serializer ingress ports in accordance with the equation:
<p, stages−1, d, pn, egress>::
  <((d*TSEports)+pn) div portsPerPlane, pn mod portsPerPlane+p*portsPerPlane, ingress>
  where portsPerPlane=TSEports div planes
  for p in 0 . . . planes−1
  for d in 0 . . . depth−1
  for pn in 0 . . . TSEports−1

7. A switch fabric as defined in claim 1, wherein:
(a) each one of said data switches further comprises two input-output connection pins for each pair of said ingress and egress ports of said one of said data switches; and,
(b) each one of said data serializers further comprises two input-output connection pins for each pair of said ingress and egress ports of said one of said data serializers.

8. A switch fabric as defined in claim 1, wherein said high speed serial links are low voltage differential signalling links.

9. A method of synchronizing operation of a switch fabric as defined in claim 1 for transport of plesiochronous signals by said switch fabric, said method comprising:
(a) allocating a pre-selected code character to mark a frame boundary beginning;
(b) initializing a frame counter upon detection of a first occurrence of said pre-selected code character in a data stream input to said switch fabric;

(c) monitoring said data stream to detect subsequent occurrences of said pre-selected code character in said data stream;

(d) re-initializing said frame counter after processing each fame of data contained in data stream; and, (e) signaling misalignment of a frame within said data stream if said pre-selected code character is not detected in said data stream upon said re-initializing of said frame counter.

10. A method as defined in claim 9, further comprising, after signaling said misalignment, re-aligning frames within said data stream by re-initializing said frame counter upon detection of a next occurrence of said pre-selected code character in said data stream.

11. A method as defined in claim 9, wherein said pre-selected code character is an 8b/10b comma character.

12. A method as defined in claim 10, further comprising:

(a) distributing to each one of said data switches and each one of said data serializers a common clock signal generated by a single clock signal generator;

(b) at each one of said data switches and each one of said data serializers:
  (i) processing said clock signal to recover a phase component of said clock signal; and,
  (ii) monitoring said data stream to recover alignment of said code characters in said data stream.

13. A method of wiring a switch fabric as defined in claim 6, said method comprising providing a lookup table for translating a physical address of each one of said ports into a logical address.

14. A switch fabric as defined in claim 1, further comprising a first memory switch coupled between said data serializer input bus and said data serializer egress ports and a second memory switch coupled between said data serializer ingress ports and said data serializer output bus, said first memory switch for transmitting data received at any time on said input bus at any one of said data serializer egress ports, said second memory switch for outputting data received at any one of said data serializer egress ports at any time on said output bus.

15. A switch fabric as defined in claim 14, wherein:

(a) each one of said data switches further comprises:
  (i) a first active memory for each one of said ingress time switches for containing indicia defining currently active connections between selected ingress time slots;
  (ii) a first standby memory for each one of said ingress time switches for containing indicia defining next active connections between said selected ones of said ingress time slots;
  (iii) a second active memory for containing indicia defining currently active connections between selected ones of said data switch ingress ports, said data switch egress ports and said space switch;
  (iv) a second standby memory for containing indicia defining next active connections between said selected ones of said data switch ingress ports, said data switch egress ports and said space switch;
  (v) a third active memory for each of said egress time switches containing indicia defining currently active connections between selected ones of said egress time slots;
  (vi) a third standby memory for containing indicia defining next active connections between said selected ones of said egress time slots;

(b) each one of said data serializers further comprises:
  (i) an active memory for containing indicia defining currently active connections between selected ones of said ingress and egress ports for said one of said data serializers; and,
  (ii) a standby memory for containing indicia defining next active connections between selected ones of said ingress and egress ports for said one of said data serializers;

said switch fabric further comprising a controller for switching control of each one of said data switches and each one of said data serializers between said active and standby memories of said respective data switches and said data serializers.

16. A switch fabric as defined in claim 15, wherein:

(a) each one of said data switches further comprises a start-of-frame delay register for containing a start-of-frame time signal unique to said one of said data switches;

(b) each one of said data serializers further comprises a start-of-frame delay register for containing a start-of-frame time signal unique to said one of said data serializers;

(c) said switching control further comprises issuance by said controller of a global change-connection-memory-pages signal to every one of said data switches and to every one of said data serializers;

(d) upon receipt of said global change-connection-memory-pages signal, each one of said data switches delays said switching control between said respective active and standby memories for a time interval corresponding to said start-of-frame time signal contained in said start-of-frame delay register of said one of said data switches; and, (e) upon receipt of said global change-connection-memory-pages signal, each one of said data serializers delays said switching control between said respective active and standby memories for a time interval corresponding to said start-of-frame time signal contained in said start-of-frame delay register of said one of said data serializers.

17. A switch fabric as defined in claim 14, wherein:

(a) said egress ports of each one of said data switches in one of said stages are connected to said ingress ports of each one of said data switches in a sequentially next of said stages in accordance with the equation:

<p, i, d, pn, egress>::
  <p, i+1, pn div portsPerTSE, (d*portsPerTSE)+(pn mod portsPerTSE), ingress>
  where portsPerTSE=TSEports div depth
  for p in 0 . . . planes−1
  for i in 0 . . . stages−1
  for d in 0 . . . depth−1
  for pn in 0 . . . TSEports−1 wherein egress is an output port address of said data switch, ingress is an input port address of said data switch, i is an integer representative of one of said stages, pn is an integer representative of a pair comprising one of said data switch ingress ports and one of said data switch egress ports, TSEports is an integer representative of the total number of said data switch ingress and egress ports for each one of said data switches, planes is an integer representative of the total number of said planes, stages is an integer representative of the total number of said stages, depth is an integer representative of the total number of said depths, and portsPerTSE is an integer representative of the total number of egress ports in every one of said data switches within a first one of said stages connected to each one of said data switches within a sequentially next one of said stages;

(b) said egress ports of each one of said data serializers are connected to said ingress ports of a first stage of said data switches with the equation:

<a, e, egress>::
   <e div portsPerPlane, 0, (a*portsPerPlane) div TSEports, ((a*portsPerPlane) mod TSEports+e mod portsPerPlane, ingress>
   where portsPerPlane=TBSports div planes
   for a in 0 . . . TBScount−1
   for e in 0 . . . TBSports−1 wherein portsPerPlane is the number of said data serializer ports in each one of said planes, TBSports is the number of said data serializer ingress and egress port pairs for each one of said data serializers, TBScount is the total number of said data serializers, a is an integer representative of an address of one of said data serializers, and e is an integer representative of a port on said one of said data serializers;

(c) said egress ports of a last stage of said data switches are connected to said ingress ports of each one of said data serializers in accordance with the equation:

<p, stages−1, d, pn, egress>::
   <((d*TSEports)+pn) div portsPerPlane, pn mod portsPerPlane+p*portsPerPlane, ingress>
   where portsPerPlane=TSEports div planes
   for p in 0 . . . planes−1
   for d in 0 . . . depth−1
   for pn in 0 . . . TSEports−1

18. A switch fabric as defined in claim 14, wherein:
(a) each one of said data switches further comprises two input-output connection pins for each pair of said ingress and egress ports of said one of said data switches; and,
(b) each one of said data serializers further comprises two input-output connection pins for each pair of said ingress and egress ports of said one of said data serializers.

19. A switch fabric as defined in claim 14, wherein said high speed serial links are low voltage differential signalling links.

20. A method of synchronizing operation of a switch fabric as defined in claim 14 for transport of plesiochronous signals by said switch fabric, said method comprising:
(a) allocating a pre-selected code character to mark a frame boundary beginning;
(b) initializing a frame counter upon detection of a first occurrence of said pre-selected code character in a data stream input to said switch fabric;
(c) monitoring said data stream to detect subsequent occurrences of said pre-selected code character in said data stream;
(d) re-initializing said frame counter after processing each fame of data contained in data stream; and,
(e) signaling misalignment of a frame within said data stream if said pre-selected code character is not detected in said data stream upon said re-initializing of said frame counter.

21. A method as defined in claim 20, further comprising, after signaling said misalignment, re-aligning frames within said data stream by re-initializing said frame counter upon detection of a next occurrence of said pre-selected code character in said data stream.

22. A method as defined in claim 20, wherein said pre-selected code character is an 8b/10b comma character.

23. A method as defined in claim 22, further comprising:
(a) distributing to each one of said data switches and each one of said data serializers a common clock signal generated by a single clock signal generator;
(b) at each one of said data switches and each one of said data serializers:
   (i) processing said clock signal to recover a phase component of said clock signal; and,
   (ii) monitoring said data stream to recover alignment of said code characters in said data stream.

24. A switch fabric as defined in claim 1, wherein:
(i) said ingress ports are grouped to form a plurality of ingress port groups, each one of said ingress port groups comprising two or more of said ingress ports;
(ii) said egress ports are grouped to form a plurality of egress port groups, each one of said egress port groups comprising two or more of said egress ports;
said switch fabric further comprising:
(a) an ingress memory switch coupled to said ingress port groups for selectably temporally rearranging data received at any one of said ingress port groups and for spatially rearranging data received within members of said ingress port groups; and,
(b) an egress memory switch coupled to said egress port groups for selectably temporally rearranging data transmitted via any one of said egress port groups and for spatially rearranging data transmitted within members of said egress port groups.

25. A switch fabric as defined in claim 24, wherein:
(a) each one of said data switches further comprises:
   (i) a first active memory for each one of said ingress memory switches for containing indicia defining currently active ingress time slots for each one of said ingress ports within each one of said ingress port groups;
   (ii) a first standby memory for each one of said ingress time switches for containing indicia defining next active ingress time slots for each one of said ingress ports within each one of said ingress port groups;
   (iii) a second active memory for containing indicia defining currently active connections between selected ones of said data switch ingress ports, said data switch egress ports and said space switch;
   (iv) a second standby memory for containing indicia defining next active connections between said selected ones of said data switch ingress ports, said data switch egress ports and said space switch;
   (v) a third active memory for each of said egress memory switches for containing indicia defining currently active egress time slots for each one of said egress ports within each one of said egress port groups;
   (vi) a third standby memory for containing indicia defining next active egress time slots for each one of said egress ports within each one of said egress port groups;
(b) each one of said data serializers further comprises:
   (i) an active memory for containing indicia defining currently active connections between selected ones of said ingress and egress ports for said one of said data serializers; and,
   (ii) a standby memory for containing indicia defining next active connections between selected ones of said ingress and egress ports for said one of said data serializers;
said switch fabric further comprising a controller for switching control of each one of said data switches and each one of said data serializers between said active and standby memories of said respective data switches and said data serializers.

26. A switch fabric as defined in claim 25, wherein:
(a) each one of said data switches further comprises a start-of-frame delay register for containing a start-of-frame time signal unique to said one of said data switches;
(b) each one of said data serializers further comprises a start-of-frame delay register for containing a start-of-frame time signal unique to said one of said data serializers;
(c) said switching control further comprises issuance by said controller of a global change-connection-memory-pages signal to every one of said data switches and to every one of said data serializers;
(d) upon receipt of said global change-connection-memory-pages signal, each one of said data switches delays said switching control between said respective active and standby memories for a time interval corresponding to said start-of-frame time signal contained in said start-of-frame delay register of said one of said data switches; and,
(e) upon receipt of said global change-connection-memory-pages signal, each one of said data serializers delays said switching control between said respective active and standby memories for a time interval corresponding to said start-of-frame time signal contained in said start-of-frame delay register of said one of said data serializers.

27. A switch fabric as defined in claim 24, wherein:
(a) said egress ports of each one of said data switches in one of said stages are connected to said ingress ports of each one of said data switches in a sequentially next of said stages in accordance with the equation:
<p, i, d, pn, egress>::
    <p, i+1, pn div portsPerTSE, (d*portsPerTSE)+(pn mod portsPerTSE), ingress>
    where portsPerTSE=TSEports div depth
    for p in 0 . . . planes−1
    for i in 0 . . . stages−1
    for d in 0 . . . depth−1
    for pn in 0 . . . TSEports−1
    wherein egress is an output port address of said data switch, ingress is an input port address of said data switch, i is an integer representative of one of said stages, pn is an integer representative of a pair comprising one of said data switch ingress ports and one of said data switch egress ports, TSEports is an integer representative of the total number of said data switch ingress and egress ports for each one of said data switches, planes is an integer representative of the total number of said planes, stages is an integer representative of the total number of said stages, depth is an integer representative of the total number of said depths, and portsPerTSE is an integer representative of the total number of egress ports in every one of said data switches within a first one of said stages connected to each one of said data switches within a sequentially next one of said stages;
(b) said egress ports of each one of said data serializers are connected to said ingress ports of a first stage of said data switches with the equation:
<a, e, egress>::
    <e div portsPerPlane, 0, (a*portsPerPlane) div TSEports, ((a*portsPerPlane) mod TSEports+e mod portsPerPlane, ingress>
    where portsPerPlane=TBSports div planes
    for a in 0 . . . TBScount−1
    for e in 0 . . . TBSports−1
    wherein portsPerPlane is the number of said data serializer ports in each one of said planes, TBSports is the number of said data serializer ingress and egress port pairs for each one of said data serializers, TBScount is the total number of said data serializers, a is an integer representative of an address of one of said data serializers, and e is an integer representative of a port on said one of said data serializers;
(c) said egress ports of a last stage of said data switches are connected to said ingress ports of each one of said data serializers in accordance with the equation:
<p, stages−1, d, pn, egress>::
    <((d*TSEports)+pn) div portsPerPlane, pn mod portsPerPlane+p*portsPerPlane, ingress>
    where portsPerPlane=TSEports div planes
    for p in 0 . . . planes−1
    for d in 0 . . . depth−1
    for pn in 0 . . . TSEports−1

28. A switch fabric as defined in claim 24, wherein said high speed serial links are low voltage differential signalling links.

29. A switch fabric as defined in claim 24, wherein:
(a) each one of said data switches further comprises two input-output connection pins for each pair of said ingress and egress ports of said one of said data switches; and,
(b) each one of said data serializers further comprises two input-output connection pins for each pair of said ingress and egress ports of said one of said data serializers.

30. A method of synchronizing operation of a switch fabric as defined in claim 24 for transport of plesiochronous signals by said switch fabric, said method comprising:
(a) allocating a pre-selected code character to mark a frame boundary beginning;
(b) initializing a frame counter upon detection of a first occurrence of said pre-selected code character in a data stream input to said switch fabric;
(c) monitoring said data stream to detect subsequent occurrences of said pre-selected code character in said data stream;
(d) re-initializing said frame counter after processing each fame of data contained in data stream; and,
(e) signaling misalignment of a frame within said data stream if said pre-selected code character is not detected in said data stream upon said re-initializing of said frame counter.

31. A method as defined in claim 30, further comprising, after signaling said misalignment, re-aligning frames within said data stream by re-initializing said frame counter upon detection of a next occurrence of said pre-selected code character in said data stream.

32. A method as defined in claim 30, wherein said pre-selected code character is an 8b/10b comma character.

33. A method as defined in claim 31, further comprising:
(a) distributing to each one of said data switches and each one of said data serializers a common clock signal generated by a single clock signal generator;
(b) at each one of said data switches and each one of said data serializers:
    (i) processing said clock signal to recover a phase component of said clock signal; and,
    (ii) monitoring said data stream to recover alignment of said code characters in said data stream.

* * * * *